US009836845B2

(12) United States Patent
Cole et al.

(10) Patent No.: US 9,836,845 B2
(45) Date of Patent: Dec. 5, 2017

(54) METHODS AND APPARATUS FOR DETECTING OBJECTS IN PROXIMITY TO A VIEWER AND PRESENTING VISUAL REPRESENTATIONS OF OBJECTS IN A SIMULATED ENVIRONMENT

(71) Applicant: NextVR Inc., Laguna Beach, CA (US)

(72) Inventors: David Cole, Laguna Beach, CA (US); Alan McKay Moss, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 0 days.

(21) Appl. No.: 14/835,249

(22) Filed: Aug. 25, 2015

(65) Prior Publication Data

US 2017/0061600 A1    Mar. 2, 2017

(51) Int. Cl.
*G06T 7/00* (2017.01)
*G06T 15/20* (2011.01)
*G06T 19/00* (2011.01)
*G06F 3/01* (2006.01)

(52) U.S. Cl.
CPC ............... *G06T 7/004* (2013.01); *G06F 3/011* (2013.01)

(58) Field of Classification Search
CPC ....... G06T 7/004; G06T 7/0046; G06T 15/20; G06T 19/006; G06T 7/0004; G06T 7/0008; G06T 7/11; G06T 7/13; G02B 27/0176; G06F 3/011
See application file for complete search history.

(56) References Cited

U.S. PATENT DOCUMENTS

2007/0038944 A1*   2/2007   Carignano .............. G06T 15/20
                                                           715/757
2012/0206452 A1    8/2012   Geisner et al.
2012/0320216 A1   12/2012   Mkrtchyan et al.
(Continued)

OTHER PUBLICATIONS

Notification of Transmittal of The International Search Report and The Written Opinion of the International Searching Authority or the Declaration, International Search Report and Written Opinion of the International Searching Authority from PCT/US2016/047864 dated Nov. 17, 2016 1-6 pages.

*Primary Examiner* — Jennifer Mehmood
*Assistant Examiner* — Sardis F Azongha
(74) *Attorney, Agent, or Firm* — Straub & Straub; Michael P. Straub; Stephen T. Straub

(57) ABSTRACT

Methods and apparatus for determining location of objects surrounding a user of a 3D rendering and display system and indicating the objects to the user while the user views a simulated environment, e.g., on a headmounted display, are described. A sensor, e.g. camera, captures images or senses the physical environment where the user of the system is located. One or more objects in the physical environment are identified, e.g., by recognizing predetermined symbols on the objects and based on stored information indicating a mapping between different symbols and objects. The location of the objects relative to the user's location in the physical environment is determined. A simulated environment, including content corresponding to a scene and visual representations of the one or more objects, is displayed. In some embodiments visual representation are displayed in the simulated environment at locations determined based on the location of the objects relative to the user.

21 Claims, 14 Drawing Sheets

(56) References Cited

U.S. PATENT DOCUMENTS

| | | |
|---|---|---|
| 2014/0253540 A1 | 9/2014 | Dori et al. |
| 2014/0368537 A1 | 12/2014 | Salter et al. |
| 2015/0234192 A1* | 8/2015 | Lyons ................ G02B 27/0172 345/8 |
| 2015/0348327 A1* | 12/2015 | Zalewski ................. G06F 3/01 345/419 |
| 2016/0062125 A1* | 3/2016 | Baek ................. G02B 27/0176 361/679.01 |
| 2016/0300388 A1* | 10/2016 | Stafford ................. A63F 13/69 |
| 2017/0010471 A1* | 1/2017 | Serrano Canovas ............ G02B 27/0176 |

\* cited by examiner

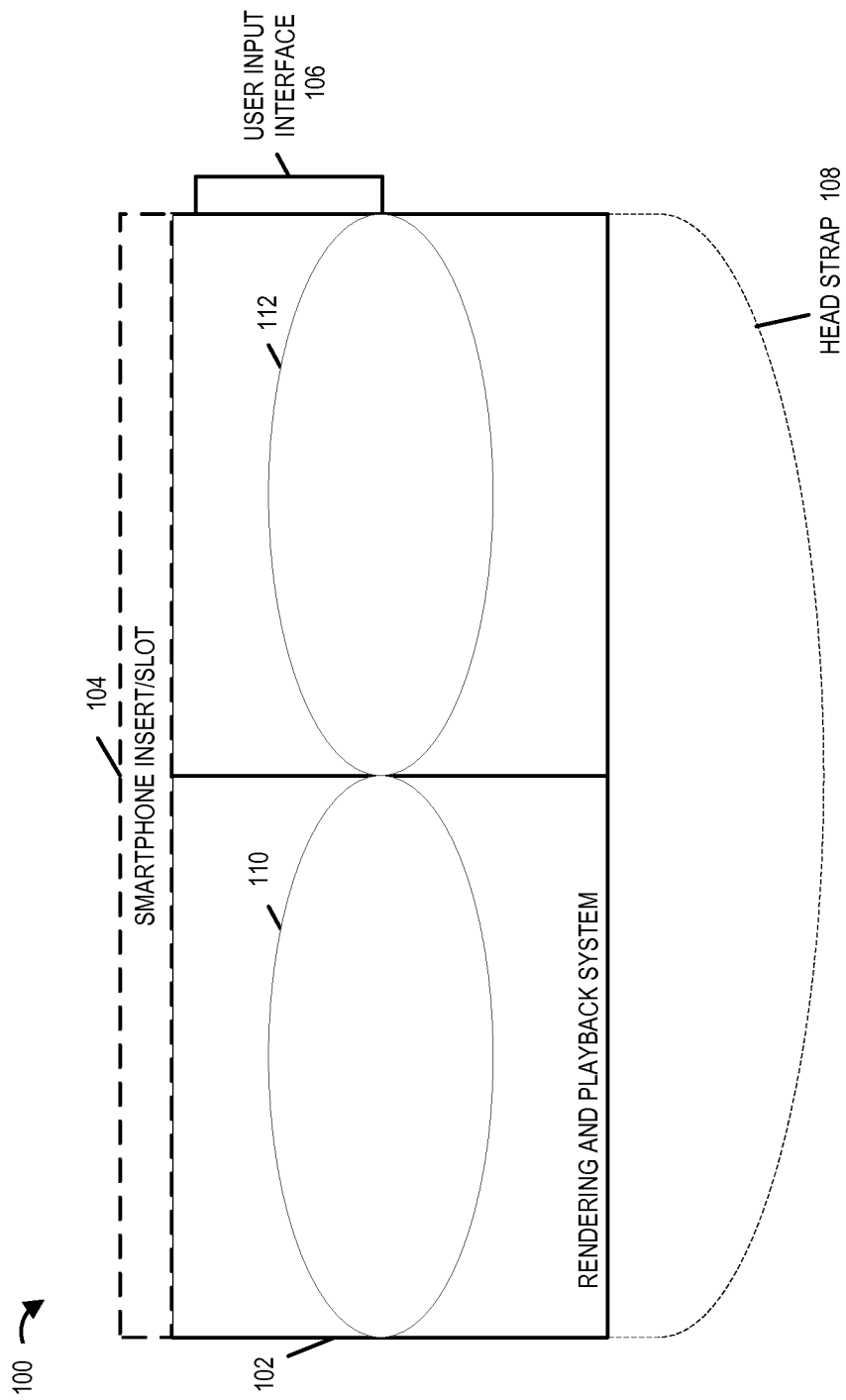

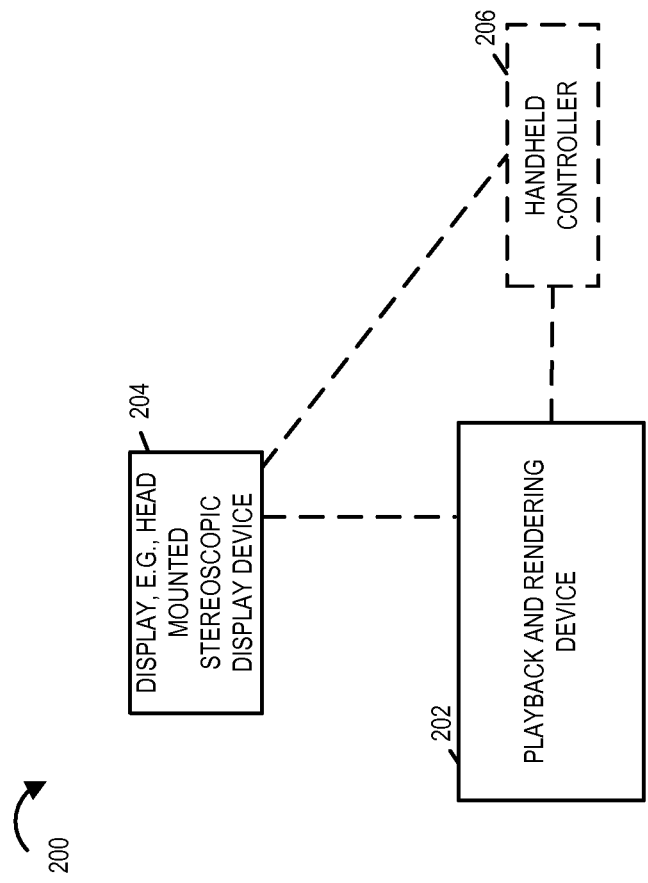

1000

| | 1002 OBJECT | 1004 SYMBOL | |
|---|---|---|---|
| 1010 → | SODA CAN | SQUARE | □ |
| 1012 → | SODA BOTTLE | CIRCLE | ○ |
| 1014 → | BEER CAN | TRIANGLE | △ |
| 1016 → | POP CORN | PENTAGON | ⬠ |
| 1018 → | CHIPS | HEXAGON | ⬡ |
| 1020 → | ICE CREAM | HEPTAGON | ⬣ |
| 1022 → | CANDY | ELLIPSE | ⬭ |
| 1024 → | COFFEE CUP | CROSS | ✚ |
| 1026 → | WATER BOTTLE | RIGHT TRIANGLE | ◢ |
| 1028 → | WINE BOTTLE | RECTANGLE | ▭ |
| 1030 → | CIGARETTE PACK | ARROW | ⇧ |
| 1032 → | CIGAR CASE | STAR | ☆ |

FIGURE 10

METHODS AND APPARATUS FOR DETECTING OBJECTS IN PROXIMITY TO A VIEWER AND PRESENTING VISUAL REPRESENTATIONS OF OBJECTS IN A SIMULATED ENVIRONMENT

FIELD

The present application relates to stereoscopic playback methods and apparatus and, more particularly, to environment simulation methods and/or systems which can generate and/or display a simulated environment.

BACKGROUND

Users of 3D devices often enjoy being in 3D environment, e.g., a simulation of an actual 3D environment such as a sports area. The simulated 3D environment can provide a user an experience similar to being in a front row seat at a sporting event.

In order to enjoy the 3D simulation, a participant often wears a head mounted display. In many cases, the head mounted display is a display of a cell phone which has been inserted in to a helmet which supports the cell phone so that the display is positioned directly in front of the user's eyes. Different images maybe and sometimes are displayed on the left and right sides of the display so that different images will be perceived by the user allowing the user to enjoy a 3D experience.

While use of the head mounted display may provide the user with a visual experience similar to being at a game or other sporting event, an important feature of sports and/or other entertainment experiences often involves the consumption of food and/or drink. For example, attendees at a football or hockey game maybe accustomed to drinking beer or soda while seated at a sporting event. The consumption of popcorn, hot dogs and/or other food may also be a common and desirable part of an entertainment experience.

While 3D display devices may provide a realistic visual and/or audio experience to many users, the wearing of a head mounted display may interfere with the ability to locate and/or enjoy food and beverages while wearing the head mounted display. This is because the head mounted display blocks the view of the actual environment, location and/or surroundings of the user wearing the head mounted display.

While removing a head mounted display can allow a user to locate food or beverages in the actual real world environment, e.g., room of a house, in which the user was using the 3D simulator, unfortunately, removing the head mounted display takes the user out of the 3D simulated environment which ceases to be viewable when the display is removed and places the user back in the real world environment, e.g., room in which the user was using the 3D simulator apparatus. This has the effect of breaking the sense of being at the event, e.g., sports game, which was being displayed by the 3D simulator. Unfortunately without removing the headgear and viewing the real environment, users of current 3D simulators are often unable to locate food or beverages in the real environment while viewing the simulated environment.

In view of the above discussion, it should be appreciated that there is a need for methods and/or apparatus which would facilitate a user of a 3D simulator being able to determine the location of objects, e.g., food, beverages, etc. in the real physical environment around the user while still viewing a simulated environment.

SUMMARY

Methods and apparatus for determining the location of objects surrounding a user of a 3D display device, e.g., head mounted display, and indicating the location of objects surrounding the user of the head mounted display to the user while the user views a simulated environment are described. The methods and apparatus are well suited for use where the simulator apparatus includes one or more sensors, e.g. cameras, which can be used to capture images or sense the environment in which the user of the simulator apparatus is located.

In at least one embodiment the simulator apparatus includes a cell phone with the screen of the cell phone being used as the head mounted display. In at least some such embodiments the cell phone includes one or more cameras which, while the cell phone is mounted in the display, face outward from the head mounted display. One or more images of the environment are captured using the cell phone camera as an environmental sensor. Objects in the captured images are identified and the location of the individual object relative to the cell phone camera and thus position of the user are determined.

For individual identified objects, the location relative to the user of simulator is stored and the type of object is also stored. Identified objects are compared to objects known to be of interest to the user to determine if the user has indicated a desire to be informed of the location of the identified object or objects while in the simulated environment. For example a user may specify that he would like to have the location of beer and potato chips food bowls indicated to him while in the 3D simulated environment. The user may also express that he is not interested in particular types of food, drink and/or other items in the environment which may be detected, for example other items such as table lamps, picture frames and decorative items placed on a table nearby the food items of interest. For example, a user may indicate that he is not interested in soda while being interested in beer or other alcoholic drinks.

In addition to a user being able to indicate that they are not interested in particular items or objects, control settings may be used and/or set to indicate that users are not to be shown or informed of the location of particular objects while in the simulated environment. For example, a parent may set a parental control setting indicating that a particular child user is not to be displayed the location of actual detected alcoholic beverages while in the simulated 3D environment whether or not the child user expresses an indication or interest in such objects.

Thus, in some embodiments while a child and adult are in the same room with the same objects, while using the 3D simulator apparatus the location of detected soda in the room maybe indicated to the child while an adult in the room may receive an indication of the location of the alcoholic drinks in addition to the location of the soda.

In some embodiments, in order to facilitate the detection of objects of interest to a user, different objects are labeled with easily identifiable labels. The labels maybe and in some embodiments are in the form of adhesive stickers which can be placed on the objects to be identified. The labels include geometric shapes alone or in combination with color in some embodiments to facilitate easy recognition using optical recognition software capable of detecting basic shapes and colors or the combination thereof. The geometric shapes maybe of a predetermined size.

For example, a soda container such as a cooler including soda may be identified with a sticker including a blue square of a predetermined size. A cooler including beer may be indicated by a sticker including a red star of a predetermined size. Potato chips maybe identified by a sticker including a green circle of a predetermined size while corn chips may be identified by use of a sticker with a yellow triangle. Other shapes and/or shape color combinations maybe and sometimes are used to identify other types of objects, food or beverages.

The use of such basic shapes and a known association to particular types of objects, food and/or beverages makes identification of different objects relatively easy using captured images since such object can be detected using shape and/or color recognition software. Since the labels and geometric shapes are of a predetermined size in some embodiments, based on the size of the detected object in a captured image the relative distance to the object may be determined. For example detection of a small blue square will be interpreted as a soda container further away from the user wearing the head mounted apparatus including the camera that was used to capture the image than a cooler including soda which is detected as a larger blue square in the same image.

While distance of the detected object may be determined based on the size of the geometric shape which is detected, the position relative to the user wearing the helmet including the camera which captured the image can be determined by the position of the detected object in the captured image, e.g, based on the known relative relationship of the camera position to the user. For example, if the camera is part of a cell phone mounted in the headmounted display, the position of the camera in the cell phone when located in the head-mounted display can be taken into consideration when determining where the position of the object to the user given that the camera will be mounted on the user's head. The location information may include angle information indicating the angle at which a detected object is relative to the user, e.g., assuming that the user. In some embodiments where angle to the user is determined the object is presumed to be at a distance within arms reach, e.g., 0.25 to 4 feet from the user. Even if the distance estimate is slightly off the user can lean out with his/her hand extended at the relative angle of the object shown in the virtual environment and detect the object in the actual environment if the relative angle of the object to the user's position known with is reasonable certainty.

Using information about the detected location and/or distance from the user of the head mounted display, visual representations of the detected objects are placed into the 3D environment being displayed to a user. For example, an avatar or object resembling a bowl of chips maybe and sometimes is displayed in the 3D environment at the location relative to the viewer which corresponds to the location of an actual bowl of chips in the actual environment in which the user is located relative to the user's position in the actual environment. Thus, while the bowl of chips is displayed to the right of the user within arms reach in the simulated environment, the user can reach out to the right and retrieve the actual bowl of chips for consumption without having to remove his/her helmet. Thus the user need not leave the simulated environment or remove the headgear to locate and/or obtain access to food, drink or other objects in the real environment. This approach can provide the user with information about the location of actual objects in the user's real environment in a way that does not significantly degrade the user's sense of being at a sporting event or other location corresponding to the simulated environment. Thus, a user of the simulator can enjoy a much more realistic overall experience including real food and drink while experiencing a simulated presence at a sporting event or other entertainment venue.

While processing resources may be limited in the case where cell phone's are used as the image capture and display device which is the case in some embodiments, the image capture and location determination can be, and in some embodiments is performed at a relatively slow rate, e.g. once every few seconds or even minutes. This is possible since the actual environment is not likely to change at a very high rate. In embodiments where image capture and object detection is performed at a relatively low rate, the majority of processing resources can be dedicated to the rendering and display of the actual 3D simulated environment with the image detection and location display features consuming a small fraction of available processing resources. The use of geometric shapes alone and/or in combination with colors allows the object detection to be performed using relatively simple object recognition algorithms which can be implemented in a computationally efficient manner. Thus, in embodiments where such labels are used to facilitate object detection processing resources can be conserved as compared to other embodiments where more detailed or complex labels are used to identify objects or object recognition is implemented without the help of such labels. Thus the use of labels of the type described herein can make object detection and location indication possible in simulator apparatus where processing resources are constrained and sufficient processing resources might not be available if identification of bowls and/or bottles needed to be made without the help of such labels, e.g., based on the shape of the bowl or bottle.

An exemplary method of operating an interactive system in accordance with an embodiment comprises: detecting one or more objects in a physical environment where a user of the interactive system is physically located; and displaying a simulated environment to the user, displaying a simulated environment including displaying, on a display, a visual representation of at least a first detected object. In some embodiments the simulated environment is a 3D simulated environment including content corresponding to a scene of an event (e.g., sporting event).

Numerous variations on the above described methods and apparatus are possible. Numerous additional aspects, benefits and embodiments will be discussed in the detailed description which follows.

BRIEF DESCRIPTION OF THE FIGURES

FIG. 1A illustrates a rear or backside view of an exemplary interactive system, e.g., a rendering and playback system, implemented in accordance with one exemplary embodiment of the invention.

FIG. 2 illustrates another exemplary interactive system, e.g., rendering and playback system, implemented in accordance with some other embodiments of the invention.

FIG. 10 illustrates an exemplary information table including mapping information indicating a mapping between one or more objects and corresponding symbols used in accordance with one exemplary embodiment.

DETAILED DESCRIPTION

Figure 1B:
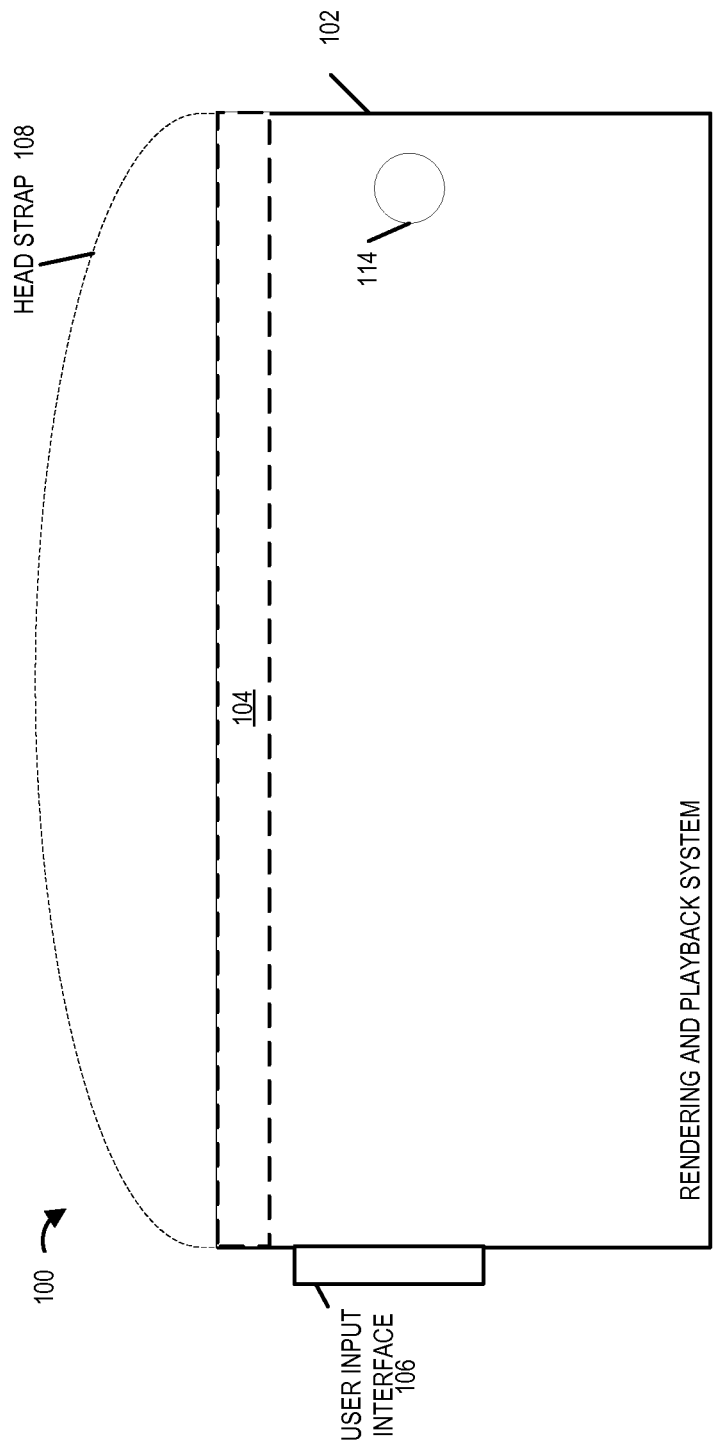
FIG. 1B illustrates a front view of the exemplary interactive system, e.g., as viewed from the front, in accordance with an exemplary embodiment.

FIG. 1A illustrates an exemplary interactive system 100, e.g., a 3D rendering and playback system, implemented in accordance with one exemplary embodiment of the invention. The interactive system 100 may be used to detect one or more objects in the physical environment where the interactive system 100 is deployed 1 and display the visual representation of the detected objects in a simulated environment to a user of the system 100, in accordance with one exemplary embodiment. FIG. 1A shows a rear view of the 3D rendering and playback system 100 from the perspective of user as if the user is going to wear, e.g., head mount, the rendering and playback system 100. Thus the illustrated view in FIG. 1A shows at least some elements that may be visible from the rear, e.g., looking into the rendering system 100 from the rear. The exemplary 3D rendering and playback system 100 includes a headmounted display assembly 102, a Smartphone insert/slot 104, a user input interface 106, a pair of lenses 110, 112 and a head strap 108.

Via the Smartphone insert/slot 104, a Smartphone can be inserted in the headmounted display assembly 102. Once inserted in the slot 104 the Smartphone can communicate and exchange signaling with the headmounted display assembly 102. The Smartphone insert/slot 104 is shown as a dashed rectangular box to indicate the location of the slot 104 in the top portion of the system 100. The Smartphone serves as both the rendering and playback device, e.g., performing processing, rendering, playback and various operations for the system 100, and as the display device of the system 100 with the Smartphone screen serving as the display screen of the system 100. When mounted by a user, the user can view a displayed scene, e.g., a simulated 3D environment including content corresponding to a scene, through the lenses 110, 112. The simulated 3D environment displayed to the user allows for a real life 3D experience as if the user is actually present in the simulated environment. In some embodiments the Smartphone camera is controlled to capture information corresponding to the physical environment where the user is physically located, e.g., capture images of the physical environment. In some embodiments the captured information corresponding to the physical environment is used to detect and identify objects, e.g., soda bottle, beer cans, bag of chips etc., present in the vicinity of the user in the physical environment.

Via the user input interface 106 user input is detected and actions are taken by the interactive system 100. For example in some embodiments a user input via the interface 106 may indicate activation of a zoom mode of operation during which a displayed scene is zoomed in accordance with the features of the invention. In some embodiments the user input interface 106 includes a touchpad over which the user can move his fingers and a corresponding pointer on the display screen moves along allowing the user to interact with objects displayed on the screen. In such embodiments the user may control the pointer to interact, e.g., select, move, delete etc., with icons and/or objects displayed on the screen.

FIG. 1B illustrates a front view of the exemplary interactive system 100, e.g., as viewed from the front, in accordance with an exemplary embodiment. As can be seen, in the front view only a relatively flat front surface of the system 100 is visible. In addition a small circular camera opening 114 can be seen on the front side which serves as an opening for a camera, e.g., the camera of the Smartphone inserted into the slot 104, to capture images of the physical environment in accordance with the features of the present invention. In addition to the Smartphone camera there may be additional cameras included in the interactive system 100, e.g., on the front surface or on top.

FIG. 2 illustrates another exemplary interactive system 200, e.g., a 3D rendering and playback system, implemented in accordance with some other embodiments of the invention. The interactive system 200 maybe used to implement the methods of the present invention and detect one or more objects in the physical environment where the interactive system 200 is located and display the visual representation of the detected objects in a simulated environment to a user of the system 200. The exemplary 3D rendering and playback system 200 includes a playback and rendering device 202, e.g., a gaming console such as PS3, PS4, Xbox etc. In addition the interactive system 200 further includes a stereoscopic display 204, and optionally a handheld controller 206. The elements 202, 204 and 206 of the system 200 may be wired and/or wirelessly connected (e.g., dashed lines showing links). The display 204 in some embodiments is a headmounted stereoscopic display while in some other embodiments the display 204 may be another display device capable of displaying stereoscopic imaging content. In some embodiments the headmounted stereoscopic display 204 includes one or more sensors, e.g., cameras, to capture information corresponding to the physical environment where the user of the system 200 is physically located, e.g., capture images of the physical environment. In some embodiments the playback and rendering device 202 includes one or more sensors, e.g., cameras, to capture information corresponding to the physical environment where the system 200 and/or user of the system 200 is located. In some embodiments the captured information corresponding to the physical environment is used to detect and identify objects, e.g., soda bottle, beer cans, bag of chips etc., present in the vicinity of the user in the physical environment.

Figure 3:
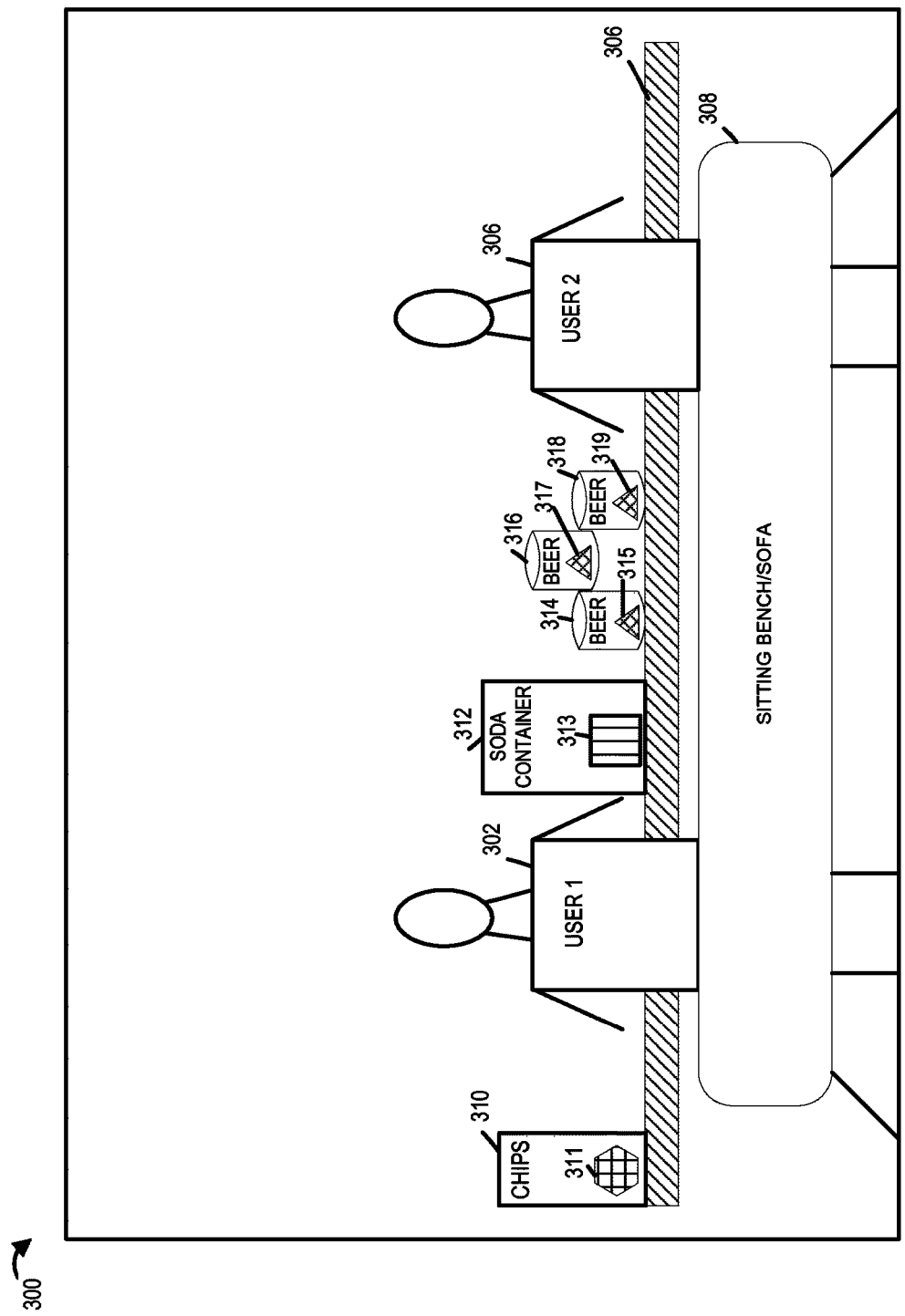
FIG. 3 illustrates an exemplary physical environment where one or more users of an interactive system shown in FIGS. 1 and 2 are physically located at a given time.

FIG. 3 illustrates an exemplary physical environment 300 where one or more users of an interactive system shown in FIGS. 1 and 2 are physically located at a given time. As illustrated the exemplary physical environment 300 includes a first user, e.g., user 1 302, and a second user, e.g., user 2 304 sitting comfortably on a sitting bench/sofa/couch 308, e.g., to watch content corresponding to an event, e.g., a game, a theatrical performance etc., in a simulated 3D environment as can be experienced using the system 100 or 200 for rendering, playback and display. The exemplary physical environment 300 further includes a support structure 306, e.g., a table or another platform over which object can be placed, and a plurality of objects including a bag of chips 310, a soda container/cooler 312, a plurality of beer cans 314, 316, and 318. The soda container/cooler 312 may include one or more soda cans/bottles. The bag of chips 310 is located to the left of user 1 302 while the soda container/cooler 312 and beer cans 314, 316, 318 are located to the right of user 1 302 in the exemplary physical environment 300 and are assumed to be approximately within an arms reach of user 1 302. The user's reach may be somewhat extended by leaning forwarding or to the side. From the perspective of user 2 304 the soda container/cooler 312 and beer cans 314, 316, 318 are located to the left of user 2 304 in the exemplary physical environment 300 and are assumed to be approximately within an arms reach. In the illustrated example of FIG. 3 the bag of chips 310 is not within an arms reach of user 2 304 and may not be accessible to user 2 304, e.g., without physically moving from his/her current position. In various embodiments since the objects are in the close vicinity of the users, as one would expect them to be so the users can consume the edible items while watching content, the location of the items relative to a user can be determined relatively accurately.

In accordance with one aspect of some embodiments, a label having a symbol is provided, e.g., attached, to each of the objects with different symbols being used with/attached to different types of objects. A variety of different symbols maybe used for different types of objects. In some embodiments each symbol has a predetermined shape, size or color. A user/administrator of the system 100 and/or 200 may define a mapping between the symbols and corresponding objects, e.g., indicating which symbol corresponds to which type of object, and such information is then stored in the system 100 and 200 in some embodiments. For example a beer can/bottle (such as beer cans 314, 316, 318) may be assigned a label having a triangle as the predetermined symbol, the bag of chips 310 may be assigned a label having a hexagon as the predetermined symbol, the soda container 312 may be assigned a label having a square as the predetermined symbol. Similarly various types of different symbols may be used and attached to different types of objects. In accordance with one aspect the symbols facilitate detection and identification of objects in the vicinity of a user. While many objects may have similar shapes, appearance and sizes, e.g., a bag of chips and bag of pop corn may look similar and a can of beer and a can of iced tea may be similar, by attaching or otherwise associating symbols with different types of objects such objects can be easily detected and identified, e.g., using optical recognition techniques, in accordance with the features of the invention. In accordance with the features of some embodiments one or more objects in the physical environment 300 where a user of the interactive system 100/200 is physically located are detected. In some embodiments the objects are detected using one or more images of the physical environment 300 captured by a camera. In some embodiments the predetermined symbols on the objects in the physical environment are recognized, e.g., using an optical recognition technique, and the objects are identified based on the recognized predetermined symbols on the objects. Furthermore in accordance with one aspect visual representations of the one or more detected objects are presented to the user, e.g., on the display, as part of a simulated environment including content being presented to the user. In some embodiments a visual representation of an object is e.g., an avatar representing the object and which looks similar in appearance to the object. In some embodiments a visual representation is a graphical illustration/sketch of the object. In some embodiments a visual representation of an object is e.g., an image of the object.

Figure 4:
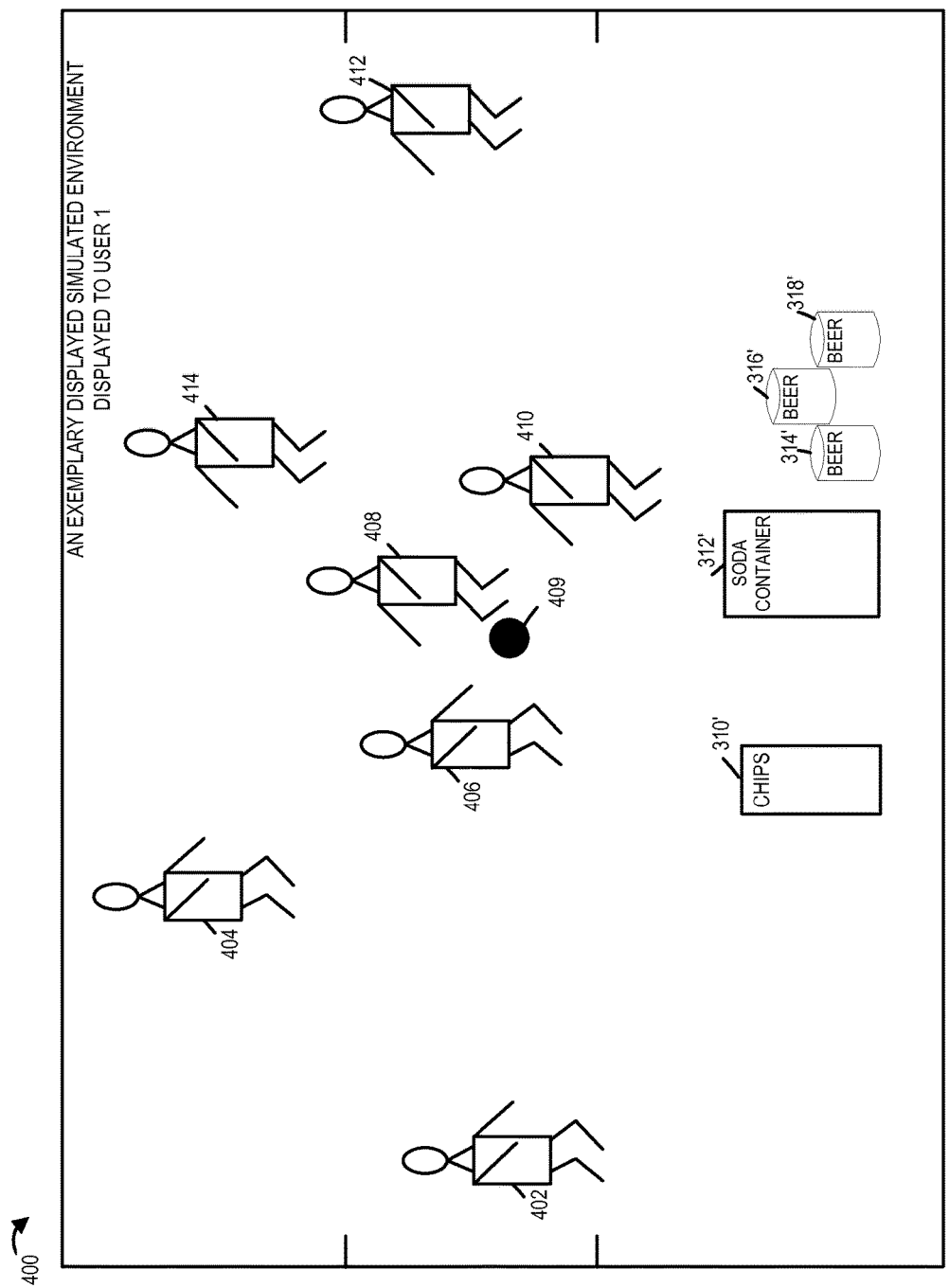
FIG. 4 illustrates an exemplary displayed simulated environment including content of a scene displayed to a first user in accordance with an exemplary embodiment.

FIG. 4 illustrates an exemplary displayed simulated environment 400 including content of a scene and visual representations of one or more objects located in the physical environment 300. FIG. 4 example depicts the simulated environment 400 that is displayed to user 1 302 with the visual representations of the one or more objects being presented at locations relative to the location of user 1 302 in the physical environment 300. In some embodiments the simulated environment is a 3D simulated environment including content corresponding to a scene of an event. In FIG. 4 example, a visual representation, e.g., an image, icon or another representation of each of the objects that are within reach of user 1 302 in the physical environment 300 are displayed to the user in the simulated environment 400.

The simulated environment 400 experienced by the user includes content corresponding to a scene, e.g., of a sports event, and the visual representations of one or more objects detected to be present in the physical environment 300. In the example of FIG. 4 the displayed scene includes content corresponding to a soccer game showing various players 410 through 414 with the soccer ball 409 in the scene. At the portion of the simulated environment visual representations of the one or more objects that are accessible to user 1 302 in the physical environment 300 are presented. While FIG. 4 illustration does not clearly show objects in 3 dimensions it should be appreciated that the simulated environment 400 is a 3D simulated environment in many embodiments.

In some embodiments the visual representation of the objects in the simulated environment 400 are presented at locations determined based on the location of the objects relative to the user, e.g., user 1 302 in the physical environment 300. The scene illustrated in FIG. 4 is from the perspective of the user while user 1 302 is in the forward facing position looking straight at the event which maybe interpreted as a 0 degree viewing angle in a 360 degree scene environment. As can be appreciated from a comparison between FIGS. 3 and 4, the visual representation of the objects appear at locations in the simulated environment 400 that correspond to the locations of the actual objects relative to the location of user 1 302 (who is wearing the headmounted system 100 or headmounted display 204) in the physical environment. For simplification the visual representation of objects are identified using the same reference numbers as the corresponding objects but with an extra prime (') at the end. As can be appreciated from FIGS. 3-4, from the perspective of user 1 302 the visual representation 310' of the bag of chips 310 which is to the left of user 1 302 in the physical environment 300 is presented at a corresponding location in the simulated environment 400 relative to the location of user 1 302. Similarly the visual representation 312' of the soda container 312 as well as visual representations 314', 316', 318' of the cans of beer 314, 316, 318 which are to the right of user 1 302 in the physical environment 300 are presented at corresponding locations in the simulated environment 400 relative to the location of user 1 302.

Figure 5:
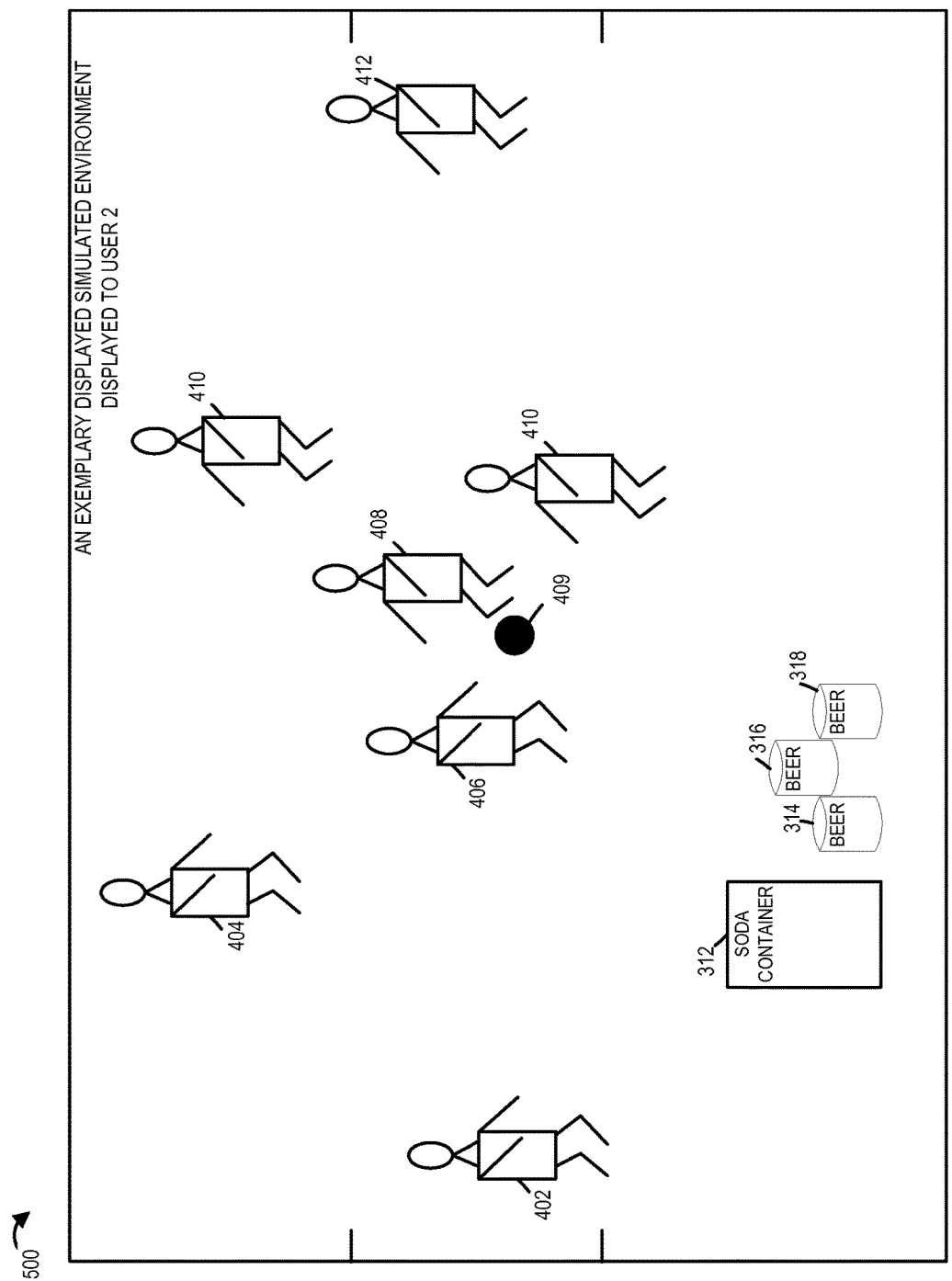
FIG. 5 illustrates an exemplary simulated environment displayed to a second user in accordance with an exemplary embodiment.

FIG. 5 illustrates an exemplary displayed simulated environment 500 including content of a scene and visual representations of one or more objects located in the physical environment 300. FIG. 5 example depicts the simulated environment 500 that is displayed to the second user, e.g., user 2 304, with the visual representations of the one or more objects being presented at locations relative to the location of user 2 304 in the physical environment 300. In some embodiments the simulated environment is a 3D simulated environment including content corresponding to a scene of an event. In FIG. 5 example, a visual representation of each of the objects that are within a hands reach of user 2 304 in the physical environment 300 are displayed to the user in the simulated environment 400.

The simulated environment 500 experienced by user 2 304 includes content corresponding to the same scene as included in simulated environment 400 but as viewed from the perspective of user 2 304 and with the visual representations of one or more objects in the physical environment 300 that are accessible to user 2 304 in the physical environment 300, e.g., within reach of user 2 304. In some embodiments the visual representation of the objects in the simulated environment 500 are presented at locations determined based on the location of the objects relative to the user, e.g., user 2 304 in the physical environment 300. The scene illustrated in FIG. 5 is from the perspective of the second user while user 2 304 is in the forward facing position looking straight at the scene which maybe interpreted as a 0 degree viewing angle in a 360 degree scene environment. As can be appreciated from a comparison between FIGS. 3 and 5, the visual representation of the objects appear at locations in the simulated environment 500 that correspond to the locations of the actual objects relative to the location of user 2 304 (who is wearing the head-mounted system 100 or headmounted display 204) in the physical environment. For simplification the visual representation of objects are identified using the same reference numbers as the corresponding objects but with an extra prime (') at the end. As can be appreciated from FIGS. 3 and 5, from the perspective of user 2 302 the visual representations 314', 316', 318' of the beer cans 314, 316, 318 which are to the left of user 2 304 in the physical environment 300 are presented at corresponding locations in the simulated environment 500 and visual representation 312' of the soda container 312 is presented to the further left of visual representation 314', 316', 318' based on its location relative to user 2 304 and objects 314, 316, 318 in the physical environment 300. It is worth noting that user 2 304 is not presented with the visual representation 310' of the bag of chips 310 even though it is available in the physical environment 300. Since the location of the bag of chips 310 in the actual physical environment 300 is such that it is not easily accessible by user 2 304, e.g., not within an arms reach even if user 2 304 leans forward or to the side. Thus in at least some embodiments visual representations of one or more objects are excluded from being displayed to the user if the corresponding objects in the physical environment are not within the given user's reach.

Figure 6:
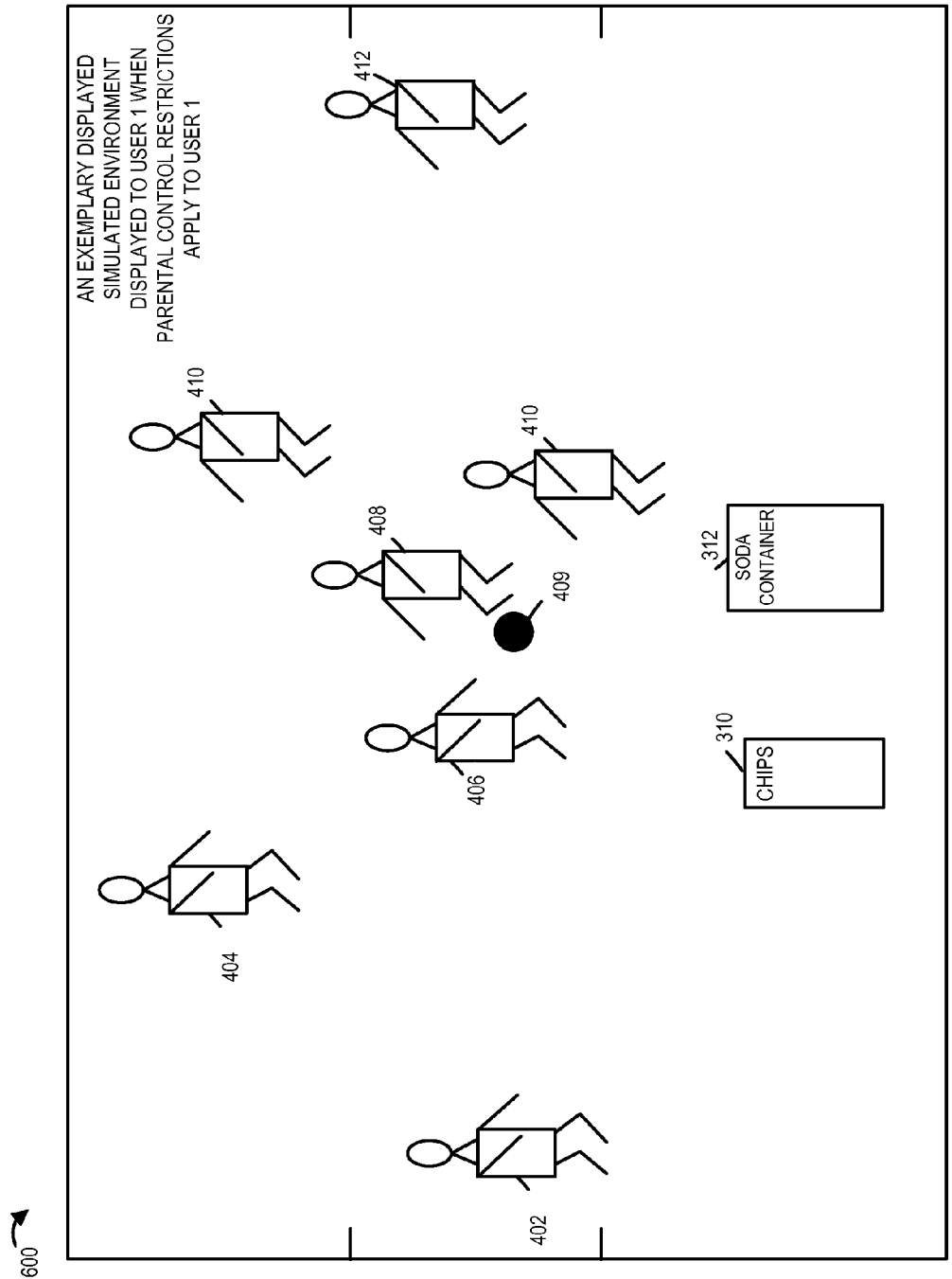
FIG. 6 illustrates an exemplary simulated environment including content of a scene displayed to the first user in a case where parental control restrictions applied to the first user cause visual representation of at least some objects to the excluded from being displayed, in accordance with one exemplary embodiment.

FIG. 6 illustrates an exemplary simulated environment 600 including content of a scene displayed to a user in a case where parental control restrictions applied to the user cause visual representation of at least some objects to the excluded from being displayed, in accordance with one exemplary embodiment. FIG. 6 example depicts the simulated environment 600 that is displayed to the first user, e.g., user 1 302, in one exemplary embodiment where parental control restrictions apply to user 1 302, e.g., due to user 1 302 being a minor/child, thereby causing visual representation of an object to be not displayed. For the example of FIG. 6 it is considered that user 1 302 is a minor/child, e.g., under the age at which alcoholic drinks and/or beer consumption is permitted or user 1 302 is an individual prohibited from drinking alcoholic beverages for some other reason. It is further considered that parental control restrictions have been specified for user 1 302 that indicate one or more objects/items which user 1 302 is not allowed to consume and thus visual representation of such objects should not be displayed to the user. In such embodiments the simulated environment 600 experienced by user 1 302 includes content corresponding to the same scene as included in simulated environment 400 but with the visual representation of objects restricted by the parental controls applicable to user 1 302 being excluded from the simulated environment. The visual representations of the other objects not restricted by parental controls are presented in the simulated environment 600 in a manner similar to what has been discussed above with regard to FIG. 4 example. Thus in such a case user 1 302 is presented with visual representation 310' of the bag of chips 310 which is to the left of user 1 302 in the physical environment 300 and with the visual representation 312' of the soda container 312 which is to the right of user 1 302 in the physical environment 300 at corresponding locations in the simulated environment 600, however the visual representation 314', 316', 318' of the cans of beer 314, 316, 318 are excluded from being displayed due to the parental control restrictions applicable to user 1 302.

Figures 7, 7A, 7B, 7C:
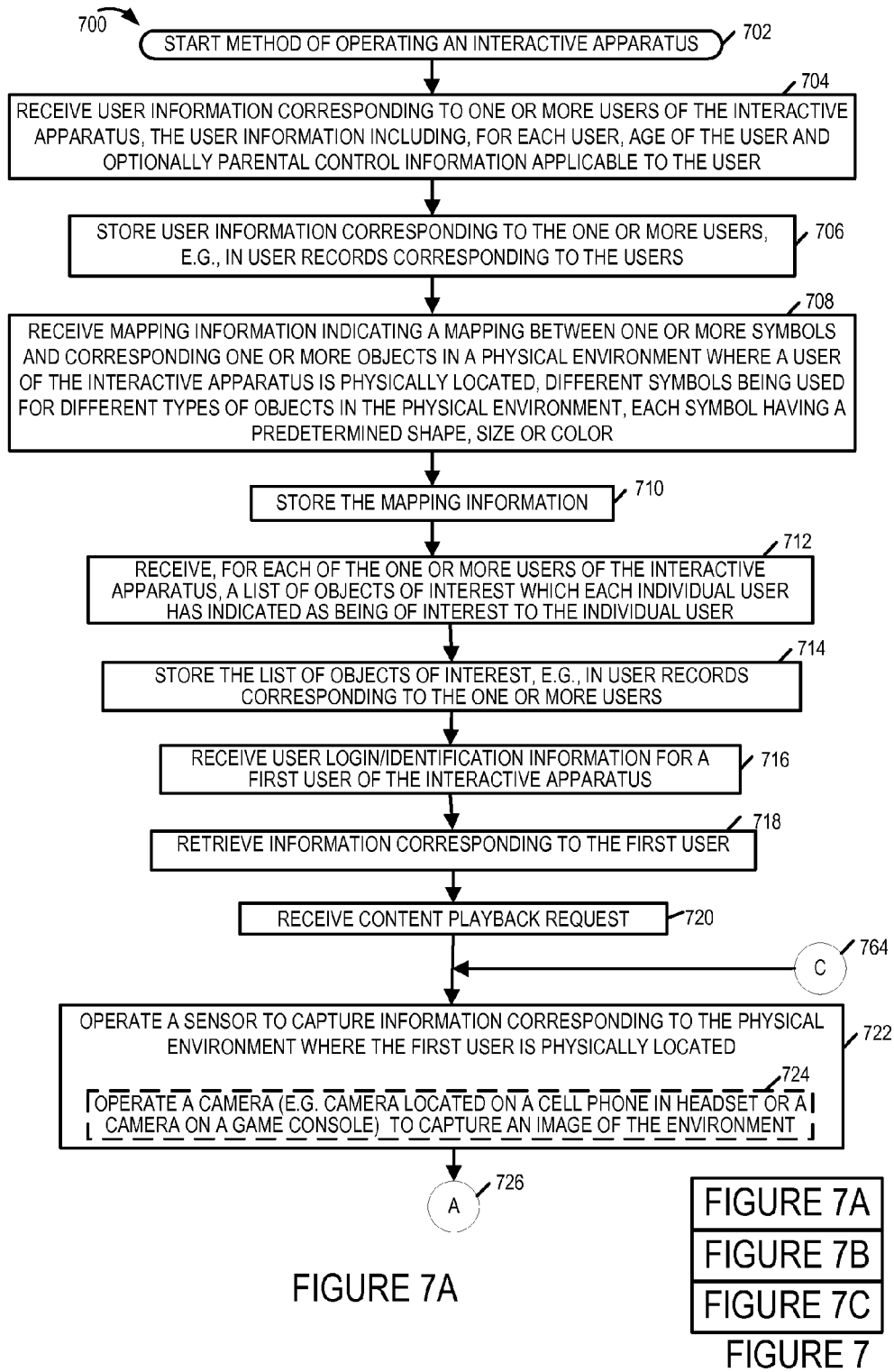
FIG. 7A is a first part of a flowchart illustrating the steps of an exemplary method of operating an interactive system in accordance with an exemplary embodiment.
FIG. 7B is a second part of the flowchart illustrating the steps of the exemplary method of operating the interactive system in accordance with an exemplary embodiment.
FIG. 7C is a third part of a flowchart illustrating the steps of an exemplary method of operating an interactive, with FIG. 7 being a combination of FIGS. 7A, 7B and 7C.
Figure 7B:
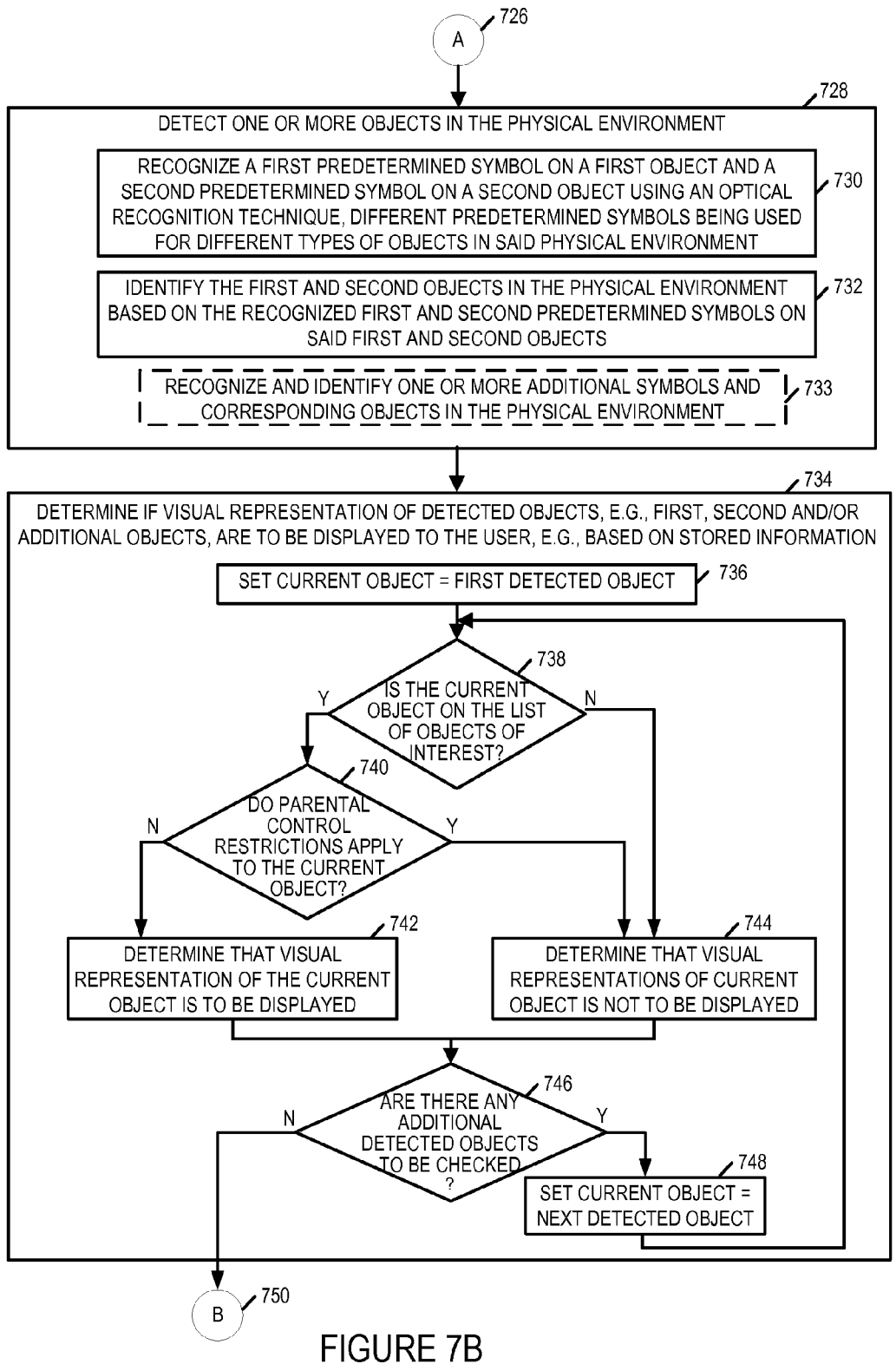
Figure 7C:
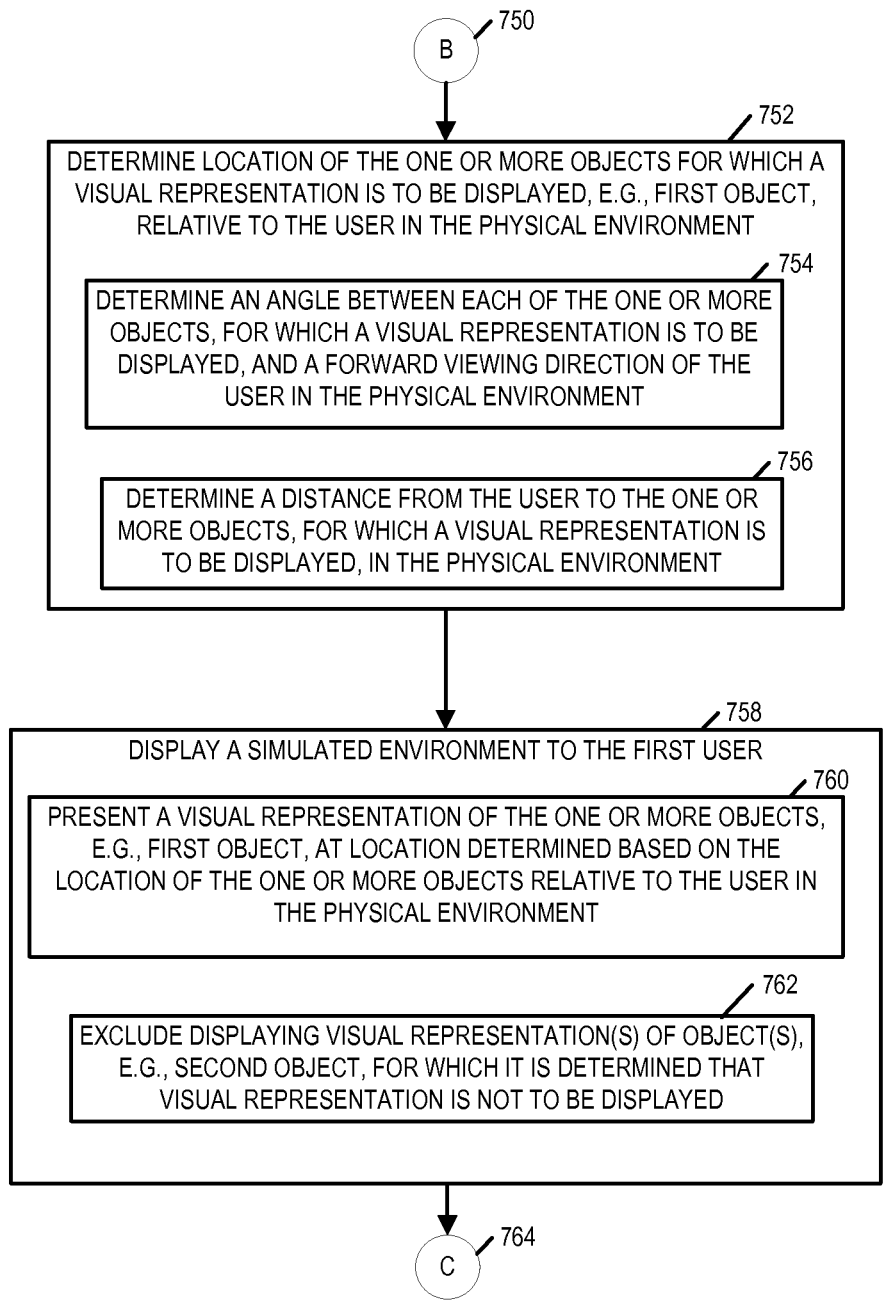

FIG. 7, which comprises a combination of FIGS. 7A, 7B and 7C, is a flowchart illustrating the steps of an exemplary method of operating an interactive system, e.g., the 3D rendering and playback system of FIG. 1 or 2, in accordance with an exemplary embodiment.

The method starts in step 702, e.g., with the rendering and playback being powered on and initialized. The method proceeds from start step 702 to step 704. In step 704 the interactive system receives user information corresponding to one or more users of the interactive system, the user information including, for each user, age of the user and optionally parental control information applicable to the user. The user information may be and in some embodiments is provided, e.g., input, to the interactive system by an administrator who may also be one of the users of the interactive system. The administrator may be, e.g., head of the household or head of the group of user. For example the user may include a bunch of individuals from a household including adults, teenagers as well as young kids. An adult member, e.g., father, eldest brother/sister, mother may assume the role of the administrator and provide user information for each user of the system. In some embodiments upon receiving user information for one or more users the interactive system generates individual user records of the one or more users with each user record including information regarding the user to which the record corresponds. While an individual user can add information to his/her user record, e.g., to add a list of objects of interest as will be discussed, in some embodiments the individual users are not allowed to alter and/or modify the parental control information which is part of the user information provided by the administrator. In some embodiments a user record for a user includes name of the user, age, login information, e.g., username-password for login to the interactive system, parental control information if applicable and list of objects of interest as will be discussed. Operation proceeds from step 704 to step 706 wherein the received user information for the one or more users is stored in the memory, e.g., in user records corresponding to these users.

Operation proceeds from step 706 to step 708. In step 708 the interactive system receives mapping information, e.g., from a user of the interactive system, indicating a mapping between one or more symbols and corresponding one or more objects in a physical environment (e.g., physical environment 300) where the user and the interactive system are located, different symbols being used on different types of objects in the physical environment, each symbol having a predetermined shape, size or color. In various embodiments in accordance with one feature label with different symbols are attached to the different types object in the physical environment that the user desires to be detected for visual representation in a simulated environment. The attachment of symbols on the objects allows for easier detection and identification of the objects by the interactive system. The mapping information provides an association between the various different types of objects, e.g., edible/consumable items, present in the physical environment with symbols which may have predetermined shape, size or color. The interactive system then can recognize and identify objects in the physical environment by recognizing the symbols and mapping them back to objects using the stored mapping information. Operation proceeds from step 708 to step 710 wherein the mapping information is stored in a memory, e.g., as part of the user records or separately as a separate data structure. An exemplary mapping information table 1000, which may be stored in a memory of the interactive system, is illustrated in FIG. 10 and discussed in detail later.

Operation proceeds from step 710 to step 712. In step 712 the interactive system receives, for each of the one or more users of the interactive system, a list of objects which each individual indicates as being of interest to the individual user. The list of objects of interest for each user may be provided by each of the users individually or may be provided by the administrator. The list of objects of interest for a given user includes items for which the given user would like corresponding visual representations be displayed in a simulated environment if such items are present in the physical environment while the user enjoying a simulated 3D environment experience, e.g., as part of watching content. Operation proceeds from step 712 to step 714. In step 714 the list of objects for each of the one or more users is stored in a memory, e.g., as part of the user records corresponding to the one or more users. Steps 702 through 714 form steps in the initialization phase of the method of flowchart 700.

Operation proceeds from step 714 to step 716. In step 716 the interactive system receives login information for a first user, e.g., via an input from the first user who wants to use the system to view content. For example the first user may launch a tool and/or app for playing content and provide username-password to initialize as is the case in some embodiments. Operation proceeds from step 716 to step 718. In step 718 the interactive system processes received login information and retrieves user record and/or information corresponding to the first user, e.g., based on the login information. The retrieved user record and/or information corresponding to the first user provides the information useful in serving the first user, e.g., in accordance with user settings and/or administrator provided settings.

Operation proceeds from step 718 to step 720. In step 720 the interactive system receives content playback request and/or command to start content playback from the first user. The content may be, e.g., video and/or multimedia content corresponding to an event, e.g., a soccer game. In accordance with the features of the present invention the requested content is presented, e.g., displayed, in a simulated 3D environment, such that the viewer/user perceives himself/herself to be present at the event to which the content corresponds. Operation proceeds from step 720 to step 722. In step 722 the interactive system operates, e.g., controls, a sensor to (e.g., camera located on a Smartphone in head mounted system 100 or a camera sensor on a rendering and playback device 202, e.g., gaming console, coupled to a headset 204 as in the system 200) to capture information corresponding to the physical environment where the first user, e.g., user 1 302, is physically located. In some embodiment the sensor used to capture information corresponding to the physical environment is the camera of the Smartphone, e.g., as used in embodiments where the interactive system being used in the system 100. In some other embodiment the information corresponding to the physical environment may be captured by a sensor which may be coupled to the playback and rendering system 202. Those skilled in the art would appreciate that the information corresponding to the physical environment may be sensed/captured using a variety of sensors and techniques, e.g., using infra red sensors. In some embodiments where the sensor is a camera step 724 is performed as part of step 722 wherein the camera is operated to capture one or more images of the physical environment 300. Thus in at least some embodiments one or more cameras are used to capture images of the physical environment for use in further processing in accordance with the invention.

Operation proceeds from step 722 to step 728 via connecting node A 726. In step 728 one or more objects in the physical environment where the first user of the interactive system is physically located are detected, e.g., using the captured information of the physical environment. In some embodiments steps 730, 732 and 733 are performed as part of step 728 of detecting one or more objects in said physical environment. In step 730 a first predetermined symbol on at least a first object and a second predetermined symbol on a second object is recognized using a recognition technique, different predetermined symbols being used for different types of objects in said physical environment, each symbol having a predetermined shape, size or color. In various embodiments the user uses, e.g., attaches or otherwise associates, different symbols on different object in the physical environment so that they can be identified and visual representations of these objects can be presented to the user in the simulated environment in accordance with the invention. For example a label with a triangle symbol may be placed on a beer can 314, a square may be placed on a soda container 312, a hexagon may be attached to the bag of chips etc. In step 730 the symbols on the objects are recognized using a recognition technique, e.g., optical and/or pattern recognition technique, to identify the object. The association/mapping between a given symbol and corresponding object is indicated by the mapping information stored in the system (step 708). In step 732 the first and second objects in the physical environment are identified based on the recognized symbols on these objects and based on the stored mapping information. In some embodiments step 733 is performed as part of step 728 where one or more additional symbols are recognized to identify the one or more additional objects in the physical environment 300.

Operation proceeds from step 728 to step 734. In step 734 it is determined if visual representation of one or more detected objects in the physical environment (e.g., first, second and/or additional detected objects) are to be displayed to the first user, e.g., based on the stored user information. Thus in some embodiments while one or more objects may be detected in the physical environment the interactive system does not necessarily present visual representation of the detected objects to the user. Rather upon detection of the one or more objects the system checks the stored user information, e.g., in user record corresponding to the given user, to determine if visual representation of the detected objects should be displayed to the user based on the stored user settings and/or parental controls. In some embodiments steps 736 through 748 are performed as part of step 734 of determining if visual representations of one or more detected objects in are to be displayed to the user. In order to check/process each of the detected objects for determining if a corresponding visual representation is to be displayed to the user consider steps 736 through 748 and the following discussion. In step 736 the first object in the detected one or more objects is set as the current object being checked/processed. Next in step 738 it is determined if the current object (e.g., first detected object in the first iteration) is on a list of objects that have been indicated as being of interest to the first user. In some embodiments the list of objects which are of interest to the user is included in the user record of first user stored in the memory. If the current object determined to be on the list of objects of interest the operation proceeds from step 738 to 740 otherwise the operation proceeds to step 744.

In step 740 it is determined if parental control restrictions apply to the current object, e.g., whether parental controls restrict displaying of visual representation of the current object. In some embodiments if a detected item is on the parental control restriction list then a visual representation corresponding to that item will not be displayed to the user. Thus if it is determined that parental control restrictions apply to the current object the operation proceeds from step 740 to step 744. If it is determined that parental control restrictions do not apply to the current object the operation proceeds to step 742 where it is determined that the visual representation of the current object is to be displayed to the first user (e.g., since the object is both on the list of object of interest and the parental restriction do not apply). Operation proceeds from step 742 to step 746. Similarly in the events discussed above when the operation proceeds to step 744 the interactive system determined that visual representation of the current object is not to be displayed. Operation proceeds from step 744 to step 746.

In step 746 it is determined if there any additional detected objects to be checked/processed, e.g., checked if they are on the list of objects of interest and/or if parental control restrictions apply. If it is determined that there is an additional object to be processed the operation proceeds from step 746 to step 748. Upon determination that there is an additional object to be processed, in step 748 the interactive system sets the next object in the one or more detected objects as the current object to be checked/processed. The operation proceeds from step 748 to step 738 and the current object (e.g., second detected object in the second iteration) is processed/checked in a similar manner as discussed above and the 738 through 748 are repeated for the current (e.g., second) object. Similarly each object in the set of detected objects is processed/checked and various steps are repeated until all of the detected objects are checked. In some embodiments the processing in step 734 ends with the interactive system having a list of one or more objects for which visual representation is to be displayed based on the determinations performed as part of step 734. It is also possible that in some cases the processing in step 734 ends with the interactive system having determined that no visual representation of the detected objects is to be displayed, e.g., based on a determination that the detected objects are not on list of objects of interest or restricted out due to parental controls. For the purpose of discussion consider that it is determined in step 734 there is at least one object, e.g., first object, for which a visual representation is to be displayed while for at least one other object, e.g., second object, it is determined that a visual representation is not to be displayed.

Figure 8:
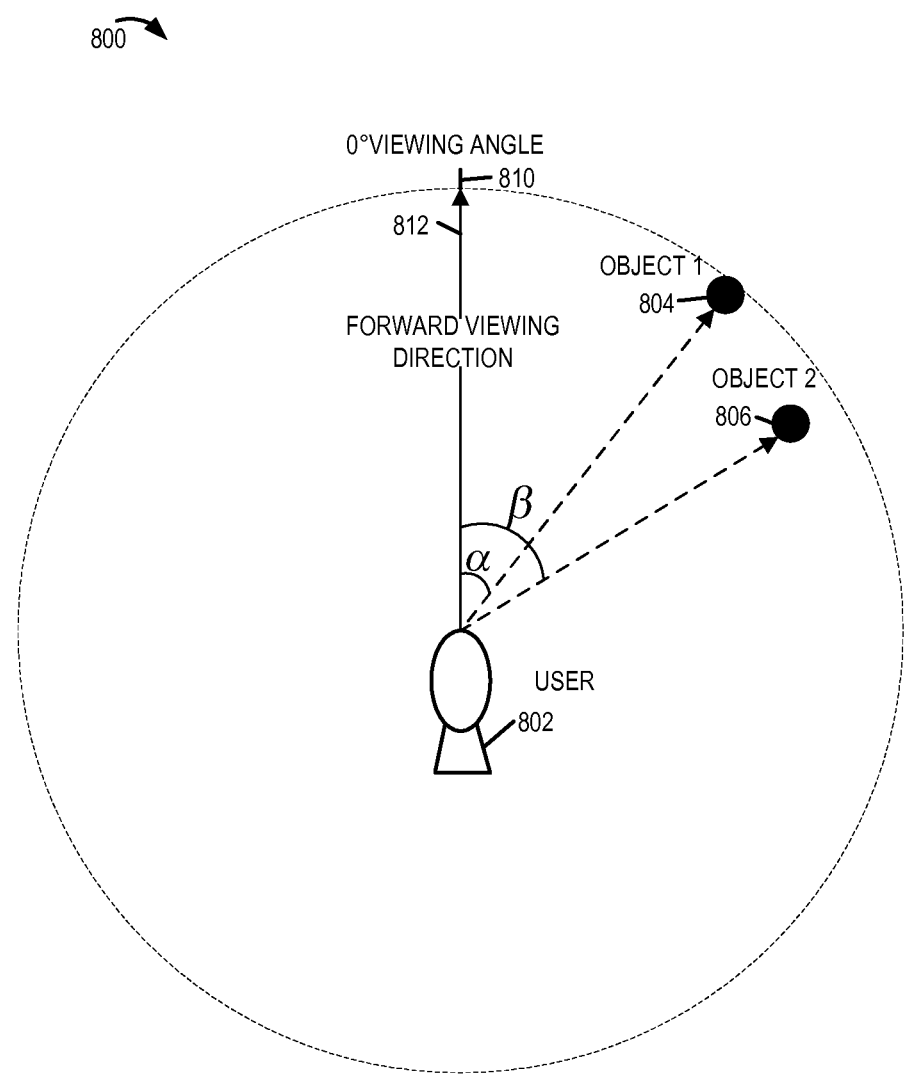
FIG. 8 illustrates an exemplary 360 degree environment, e.g., physical environment where a user of an exemplary interactive system and one or more objects are located.

If in step 746 it is determined that there are no additional objects to be processed the operation proceeds from step 746 to step 752 via connecting node B 750. In step 752 the interactive system determines the location of the one or more objects, e.g., first object, for which it is determined that a visual representation be displayed, relative to the location of the user in the physical environment. In some embodiments at least one of the sub-steps 754 or 756 is performed as part of determining the location of the objects. In step 754 an angle between each of the objects, for which a visual representation is to be displayed, and a forward viewing direction of the user in the physical environment is determined. This may include determining an offset from the forward facing position of the user, which maybe interpreted as 0 degree viewing angle, to the object. To facilitate an understanding of the operation of determining the angle, reference to FIG. 8 will now be made. FIG. 8 illustrates an exemplary 360 degree environment 800 represented by the circle, e.g., physical environment where a user 302 of interactive system and objects 804, 806 are located. The arrow 810 indicates the forward viewing direction of user 802 which may correspond to and/or be interpreted as the 0 degree viewing angle of the user if it is assumed that user 802 is facing forward looking straight, e.g., at a scene presented in the simulated environment. The objects 804, 806 maybe placed on a table in the vicinity of user 802 such that the user 802. In the illustrated example of FIG. 8 alpha (α) represents the angle between the first object 804 and the forward viewing direction 312 of user 802 while beta (β) represents the angle between the second object 806 and the forward viewing direction 312 of user 802. In some embodiments based on the determined angle and knowledge of approximate distance between the object and the first user (e.g., in many cases objects are within an arms reach of the users) the location of the object in the physical environment is determined.

Now referring back to FIG. 7C. In some embodiments as part of step 752 of determining the location of the objects relative to the first user, step 756 is performed. In step 756 a distance from the first user, (e.g., first user's location/position in the physical environment 300) to each of the one or more objects for which a visual representation is to be displayed, is determined. In various embodiments the angle and/or distance determination between the user and one or more objects facilitates determining the location of the objects relative to the user in the physical environment. Operation proceeds from step 752 to step 758.

Having determined the location of the objects, e.g., first object, for which a visual representation is to be displayed, in step 758 a simulated environment including, e.g., content corresponding to an event, is displayed to the first user 302, e.g., on the head mounted display 204 or the display screen of a Smartphone when using the system 100. In some embodiments step 758 includes step 760 wherein a visual representation of the objects, for which it is determined that a visual representation is to be displayed, is presented in the simulated environment at determined locations, e.g., locations determined based on the location of the one or more objects relative to the first user 302 in the physical environment. In some embodiments step 758 of displaying the simulated environment further includes step 762 where the interactive system excludes displaying visual representation of objects, e.g., second object, for which it is determined (e.g., in step 734) that visual representation is not to be presented. Thus in some embodiments the interactive system refrains from displaying visual representation of objects which are restricted out from being displayed, e.g., due to parental controls and/or due to not being on the list of objects of interest. Operation proceeds from step 758 back to step 722 via connecting node 764 and various steps of the exemplary method may be repeated for additional content requests received from users of the interactive system. In this way, the sensing of object and determination of their location can occur over time and the position of the objects in the simulated environment updated to reflect changes in the position of object in actual environment. The repeat of the object detection and location determination can occur at a relatively slow rate, e.g., a fraction of a supported display rate. For example 30, 60 or over 120 frames of image data maybe received, decoded and displayed before another image is captured and processed to perform object detection and/or location determination. In this manner, the object detection and location processing is limited to consuming very few processor resources as compared to the decoding and display of images corresponding to the simulated environment. Such an approach using a relatively low image capture and object detection processing rate can be useful in embodiments where processing resources are limited, e.g., because a processor of a cell phone is being used. Given that objects interest are not likely to move frequently, such a slow update rate on the order of 1 or more seconds maybe sufficient for purposes of updating the location of objects in the simulated environment based on detected changes in the objects position in the environment in which a user is located. In cases where processing resources are available for object detection image capture, object detection and updating of object position in the simulated environment can occur at a relatively rapid rate.

Figure 9:
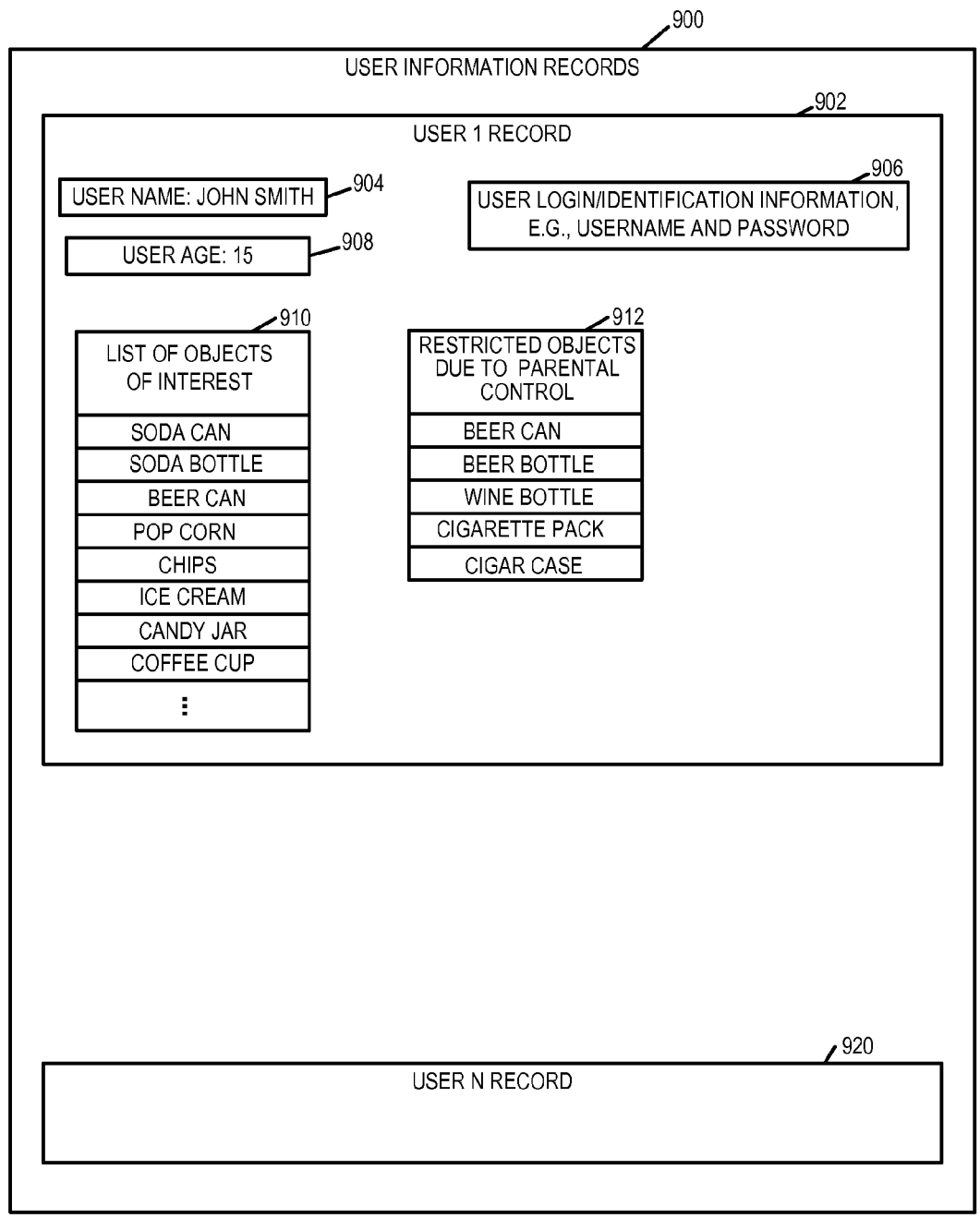
FIG. 9 illustrates exemplary user record information including user records corresponding to a plurality of users, in accordance with one exemplary embodiment.

FIG. 9 illustrates exemplary user information records 900 including user records corresponding to a plurality of users, in accordance with one exemplary embodiment. The exemplary user information record 900 may be, and in some embodiments are, stored in the memory of an interactive system of the present invention or in an element/component therein. For example in some embodiment the user information records 900 are stored in the Smartphone used a component of the interactive system 100, or in the head mounted display assembly unit 102. In some other embodiments the user information 900 record are stored in the rendering and playback unit 202 of the interactive system 200.

As illustrated the user information records 900 includes user records corresponding to a plurality of individuals/users including user 1 record 902, . . . , and user N record 920. Each of the user records 902 through 920 includes user information corresponding to the individual to which the record corresponds. As shown, user 1 record 902 includes information corresponding to a first user, e.g., user 1 302, including user name 904, user login/identification information 906, user age information 908, a list 910 of objects that are of interest to the first user, and a list 912 of objects to which parental control restrictions apply, e.g., restricted objects for which visual representation should not be displayed to the first user. In some embodiments some of the information, e.g., login information, included in each of the user records is provided by the individual users themselves while some other information, e.g., parental control restrictions, is provided by an administrator such as the head of household or an elder member of a group in the case where a user is a minor.

The user name information field 904 includes the name of the first user (e.g., JOHN SMITH in the example) to whom user 1 record 902 corresponds. The user login/identification information 906 includes username, password and/or access key information corresponding to the first user that can be used for identifying and validating the first user when the first user attempts to login and use the interactive system. The age information 908 includes age of the first user as the name suggests. In the example the age of the first user is indicated to be 15 years. The list of objects of interest 910 includes one or more objects that the first user has indicated as being of interest to the first user while the first user is using the interactive system, e.g., watching content in a simulated environment. The list of objects of interest 910 includes objects for which the first user would like a corresponding visual representation to be displayed as part of displaying the simulated environment to the first user. In the illustrated example of FIG. 9 the list of objects of interest 910 corresponding to the first user includes a soda can, a soda bottle, a beer can, pop corn, chips, ice cream, candy jar, and coffee cup. In some embodiments the first user manually enters the information in the information fields 904, 906, 908 and 910 as part of creating a user specific profile/user record 902. In some other embodiments while an administrator creates the user record 902 and provides basic information such as the name 904 and age 908 of the user along with application parental control restrictions indicating restricted objects 912, the individual user himself/herself is allowed to create his/her login information 906 and input the list of objects of interest 910. While the first user may modify/edit the login information 906 and list of objects of interest 910 as desired the first user may not have authorization to edit the parental control restrictions 912. In various embodiments when one or more objects are detected in the physical environment where the first user is physically located, the interactive system 100/200 uses the information in the user record 902 to determine which visual representations of objects should or should not be displayed to the first user, e.g., based on the information in the list 910 and 912.

The list 912 of objects to which parental control restrictions apply includes, as the name suggests, a list of restricted objects for which visual representation should not be displayed to the first user. In the illustrated example of FIG. 9 the list 912 corresponding to the first user includes a beer can, beer bottle, wine bottle, cigarette pack, and a cigar case. In accordance with the features of various embodiments, even if the objects listed in the list 912 are detected in the physical environment where the first user happens to be present, visual representations of such objects should be not displayed to the first user in a simulated environment such as the simulated environment 600. Yet for a user to whom the parental restrictions 912 do not apply, e.g., such as an adult member, visual representations of such objects will be displayed to the user. It should be noted that while the object "beer can" is listed as an object of interest in the list 910 created by the first user, the parental control restriction list 912 supersedes and thus even when a "beer can" is detected as an object in the physical environment where the first user is present a visual representation of the "beer can" will not be displayed to the first user due to the parental control restrictions restricting such display. In various embodiments the information in list 912, e.g., parental control restrictions, is provided by an administrator such as the head of household or an elder member of a group to restrict displaying visual representation of objects which the first user is not allowed to access, e.g., due to age, health, religious, moral and/or other reasons. While parental control restrictions such as information 912 may apply to some users, in some embodiments still there are other users to whom the parental restrictions do not apply, e.g., due to the users being over the legal age and/or due to the users having administrative privileges.

Similarly the user record information 900 may include user records corresponding to various other users. User N record 920 may include similar information corresponding to another individual, e.g., user N, to whom the user N record corresponds.

FIG. 10 illustrates an exemplary information table 1000 including mapping information indicating a mapping between different symbols and different types of objects used in accordance with one exemplary embodiment. In accordance with one aspect of some embodiments different predetermined symbols may be used for different types of objects that may be present in the physical environment where one or more users of an exemplary interactive system are located. The symbols may be stuck to, attached, affixed and/or otherwise associated with the corresponding objects which later facilitates detection and identification of the objects, e.g., by using the interactive system 100/200 in accordance with the features of the invention. The mapping between symbol and corresponding objects may be customized and changed as per a user/administrator's desire and the mapping information 1000 may be updated accordingly in such an event. In various embodiments different symbols are used on different types of objects in the physical environment with each symbol having a predetermined shape, size or color. In accordance with one aspect of some embodiment the interactive system of the present invention detects and identifies objects by recognizing symbols placed on the objects and looking up information table 1000 to determine what a recognized symbols maps to, i.e., by recognizing the symbol on an object, e.g., using optical recognition, and using the mapping information 1000 the interactive system determines what that object in real physical environment is. In some embodiments the mapping information 1000 is stored as part of the user information records 900 in the rendering and playback system. In some other embodiments the mapping information 1000 is stored separately in the rendering and playback system.

The exemplary information table 1000 shows one exemplary mapping between different symbols and different types of objects. Column 1002 includes a list of objects specified by name of the item while column 1004 includes a description and optionally graphical representation of the various symbols used for the corresponding objects. It should be appreciated that the information table 1000 is not exhaustive rather only exemplary in nature to facilitate an understanding of the concept. In the illustrated example of the mapping information table 1000 the mapping, e.g., chosen by a user/administrator, can be easily understood by considering each row of the columns 1002, 1004. Consider the first row 1010 of columns 1002, 1004. The first row 1010 corresponds to the first object "soda can" identified in column 1002 and the corresponding entry in the same row 1010 of column 1004 includes the description and graphical illustration of the symbol used for "soda can". As can be appreciated from the description and graphical illustration in column 1004, the mapping symbol used for "soda can" is a "square". Consider the second row 1012 of columns 1002, 1004. The second row 1012 corresponds to the second object "soda bottle" identified in column 1002 and the corresponding entry in the column 1004 includes the description and graphical illustration of the symbol, i.e., "circle" used for "soda bottle". While in the table 1000 different symbols have been shown to be used for "soda can" and "soda bottle" in some embodiments a single symbol is used for both objects since the two objects, "soda can" and "soda bottle", are basically of the same type, e.g., soda. Similarly in some embodiment one single symbol may be used for the same type of objects, for example, different objects of the same type such as a beer can, a beer bottle, a beer jug may all be mapped to and/or associated with one single symbol.

Consider the next row 1014. The third row 1014 corresponds to a third object "beer can" identified in column 1002 and the corresponding entry in the column 1004 includes the description and graphical illustration of the symbol, i.e., "triangle" used for a "beer can". Next consider the fourth row 1016 corresponding to a fourth object "pop corn" identified in column 1002. The corresponding entry in the column 1004 includes the description and graphical illustration of the symbol, i.e., "pentagon" used for "pop corn". The pentagon symbol may be placed on a bag of pop corns, bowl and/or other container used for pop corns. Consider the next row 1018 that corresponds to the object "chips" identified in column 1002 and the corresponding entry in the column 1004 includes the description and graphical illustration of the symbol, i.e., "hexagon" used for a "chips". Again the hexagon symbol may be placed on a bag of chips, bowl and/or other container used for chips. Next consider the row 1020 corresponding to the object "ice cream" identified in column 1002. The corresponding entry in the column 1004 includes the description and graphical illustration of the symbol, i.e., "heptagon" used for "ice cream". The next row 1022 corresponds to the object "candy" identified in column 1002 and the corresponding entry in the column 1004 includes the description and graphical illustration of the symbol, i.e., "ellipse" used for "candy". The ellipse symbol may be placed on, e.g., a candy jar and/or bag of candies.

Consider the next row 1024 that corresponds to the object "coffee cup" identified in column 1002 and the corresponding entry in the column 1004 includes the description and graphical illustration of the symbol, i.e., "cross" used for the "coffee cup". The next row 1026 corresponds to the object "water bottle" identified in column 1002 and the corresponding entry in the column 1004 includes the description and graphical illustration of the symbol, i.e., "right angled triangle" used for the "water bottle". The next row 1028 corresponds to the object "wine bottle" identified in column 1002 and the corresponding entry in the column 1004 includes the description and graphical illustration of the symbol, i.e., "rectangle" used for the "wine bottle". The next row 1030 corresponds to the object "cigarette pack" identified in column 1002 and the corresponding entry in the column 1004 includes the description and graphical illustration of the symbol, i.e., "arrow" used for the "cigarette pack". The last row 1032 corresponds to the object "cigar case" identified in column 1002 and the corresponding entry in the column 1004 includes the description and graphical illustration of the symbol, i.e., "star" used for the "cigar case". It should be appreciated that the table 1000 with mapping information is exemplary and many variations and mapping combinations are possible.

Figure 11:
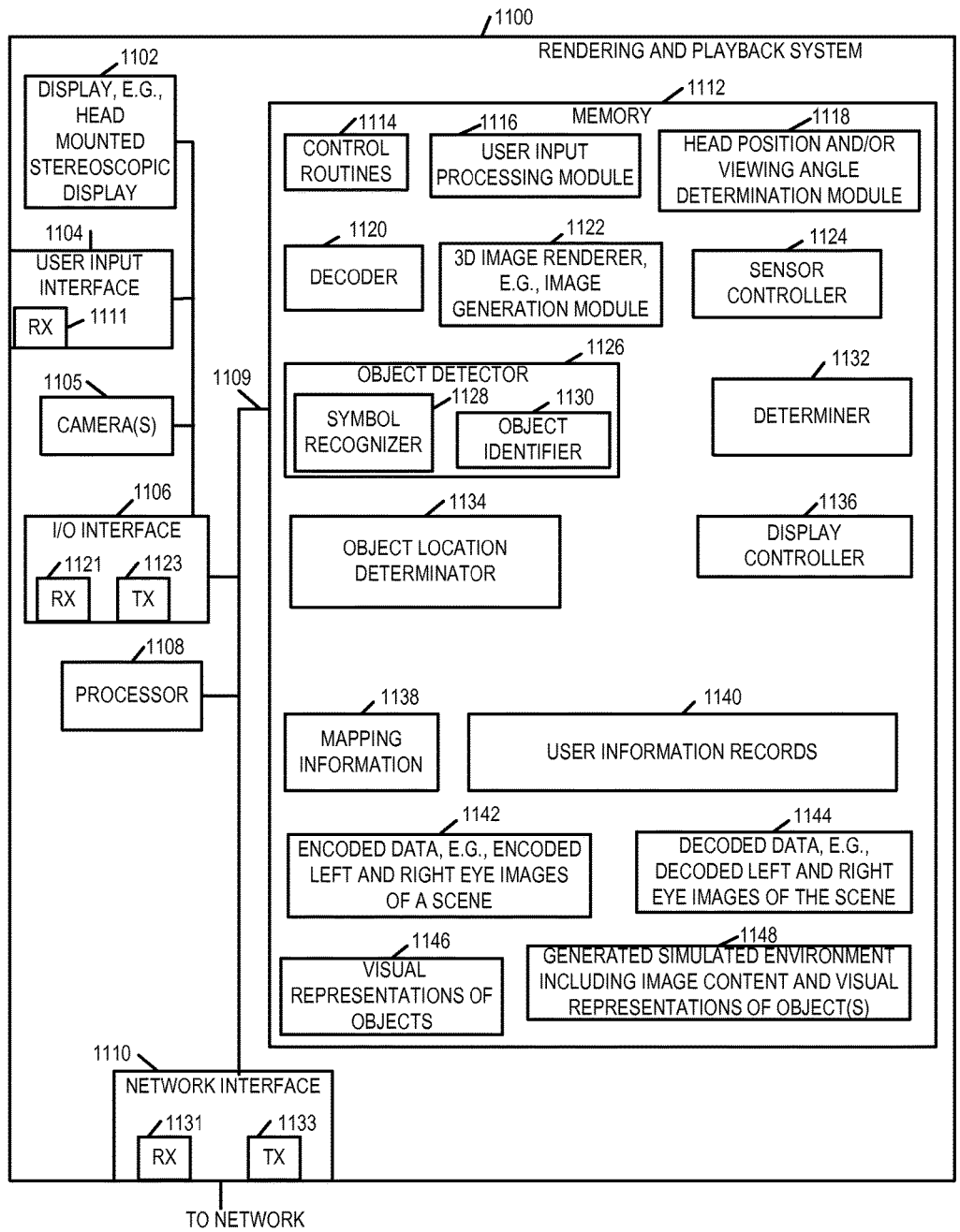
FIG. 11 illustrates an exemplary rendering and playback system that can be used to detect objects in the physical environment and display visual representation of the detected objects in a simulated environment to a user, in accordance with one exemplary embodiment.

FIG. 11 illustrates an exemplary a rendering and playback system 1100, that can be used to detect objects in the physical environment and display the visual representation of the detected objects in a simulated environment to a user, in accordance with one exemplary embodiment. The exemplary interactive system 1100 can receive, decode, store and display imaging content, e.g., in a simulated environment, to a user of the system 1100. The exemplary rendering and playback system 1100 may be used as the rendering and playback system 100 shown in FIGS. 1A and 1B and as the rendering and playback system 200 FIG. 2. The system 1100 includes the ability to decode received encoded image data, e.g., left and right eye images and/or mono (single images) corresponding to different portions of an environment or scene and generate 3D image content for display to a user, e.g., by rendering and displaying different left and right eye views which are perceived by the user as a 3D image. The rendering and playback system 1100 can detect objects in the physical environment and display the visual representation of the detected objects in a simulated environment that may also include content corresponding to an event in accordance with the invention.

The rendering and playback system 1100 includes a display 1102, display device interface 1103, input device 1104, one or more cameras 1105, input/output (I/O) interface 1106, a processor 1108, network interface 1110 and a memory 1112. The various components of the system 1100 are coupled together via bus 1109 which allows for data to be communicated between the components of the system 1100 and/or by other connections or through a wireless interface.

The rendering and playback system 1100 includes the head mounted 3D display 1102 on which the image content is presented, e.g., with left and right eyes of a user being presented with different images in the case of stereoscopic content. By displaying different images to the left and right eyes on a single screen, e.g., on different portions of the single screen to different eyes, a single display can be used to display left and right eye images which will be perceived separately by the viewers left and right eyes. In some embodiments a cell phone/Smartphone screen is used as the display 1102. In some other embodiments the playback and rendering system 1100 is used as the playback and rendering system 200. The head mounted display 1102 maybe implemented using the OCULUS RIFT™ VR (virtual reality) headset which may include the head mounted display 1102. Other head mounted displays may also be used. In a case where a cell phone, e.g., Smartphone, processor is used as the processor 1108 and the cell phone generates and displays images in a head mount assembly (such as head mount 102), the system 1100 may include as part of the head mount device the processor 1108, display 1102, camera(s) 1105 and memory 1112. The processor 1108, display 1102 and memory 1112 may all be part of the cell phone. In other embodiments of the system 1100, the processor 1108 may be part of a gaming system such as an XBOX, PS3, PS4 etc., with the display 1102 being mounted in a head mounting device and coupled to the gaming system. Whether the processor 1108 or memory 1112 are located in the device which is worn on the head or not is not critical and, as can be appreciated, while in some cases it may be convenient to collocate the processor in the headgear, from a power, heat and weight perspective it can be desirable to in at least some cases to have the processor 1108 and memory coupled to the head gear which includes the display. While various embodiments contemplate a head mounted display 1102, the methods and system can also be used with non-head mounted displays which can support 3D image.

The operator/user of the playback and rendering system 1100 may control one or more parameters, input information, commands etc., via the user input interface 1104 and/or select operations to be performed, e.g., select to display simulated environment including 3D scene content. Via the user input interface 1104 a user provides input to the rendering and playback system 1100. The user input interface may include, for example, a keyboard, keypad, touchpad (e.g., touch sensitive pad displayed on a display screen). The user input interface 1104 includes a receiver 1111 via which the rendering and playback system 1100 receives the information/data provided by the user. In some embodiment the information received via the receiver 1111 of the user input interface includes mapping information 1138 and user information corresponding to one or more users included in user information records 1140. Furthermore via the user input interface 1104 a user may enter login information, e.g., at the time of using the system 1100. The user may use the user input interface 1104 to make a selection of item and/or listing displayed on the display 1102, e.g., for playback.

The camera(s) 1105 includes one or more cameras which can be, and sometimes are, used to capture images, e.g., of persons, physical environment and/or objects in the physical environment where the system 1100 is located. In some embodiments where the system 1100 is used as the rendering and playback 100 the camera 1105 may be the camera device of the Smartphone being used in the system 100. In some embodiments where the system 1100 is used as the rendering and playback system 200 the camera 1105 may be the camera located on the rendering device 202 or on the head mounted display 204.

Via the I/O interface 1106, the system 1100 can be coupled to external devices to exchange signals and/or information with other devices. In some embodiments via the I/O interface 1106 the system 1100 can receive information and/or images captured by external cameras and output information and/or images to external devices. The I/O interface 1110 includes a receiver (RX) 1121 and a transmitter (TX) 1123 via which the receiving and transmitting operations are performed. In some embodiments via the interface 1106 the system 1100 is coupled to an external controller, e.g., such as the handheld controller 206. In some embodiments a user can provide input information, e.g., mapping information 1138 and user information corresponding to one or more users, by using the handheld controller 206 as an input device. In some such embodiments the system 1100 receives user information in user records 1140 and/or mapping information 1138 via the receiver 1121 of interface 1106. Using the handheld controller 206 coupled to the I/O interface 1106 the user may also provide login information, e.g., at the time of using the system 1100, and/or make a selection of item and/or listing displayed on the display 1102, e.g., for playback.

The processor 1108, e.g., a CPU, executes routines 1114 and uses the various modules to control the system 1100 to operate in accordance with the invention. The processor 1108 is responsible for controlling the overall general operation of the system 1100. In various embodiments the processor 1108 is configured to perform functions that have been discussed as being performed by interactive system/system 1100.

Via the network interface 1110 the system 1100 communicates and/or receives signals and/or information (e.g., including images and/or video content corresponding to a scene) to/from various external devices over a communications network, e.g., such as communications network 105. The network interface 1110 includes a receiver 1131 and a transmitter 1133 via which the receiving and transmitting operations are performed. In some embodiments the system receives one or more content streams via the network interface 1110 from a content provider. In some embodiments the system 1100 receives, via the receiver 1111 of interface 1110, one or more content streams to use for playback, e.g., stream communicating content corresponding to a scene of an event, e.g., soccer game. The received content stream may be received as encoded data, e.g., encoded scene data 1142.

In some embodiments the memory 1112 includes various routines and/or modules which when executed by the processor 1108 control the rendering and playback system 1100 to perform operations in accordance with the invention. The memory 1112 includes control routines 1114, a user input processing module 1116, a head position and/or viewing angle determination module 1118, a decoder 1120, an image renderer 1122, e.g., a 3D image generation module, a sensor controller 1124, an object detector 1126, a determiner 1132, an object location determinator 1134, and a display controller 1136. The memory 1112 further includes data/information including mapping information 1138, user information records 1140, encoded data 1142, decoded data 1144, visual representations of objects, generated simulated environment 1148, e.g., including image content and visual representation of object(s).

The control routines 1114 include device control routines and communications routines to control the operation of the system 1100. The user input processing module 1116 is configured to process received user input information and/or commands/instructions and take action accordingly and/or provide the receiver input to another element for further processing, action or storage in the memory 1112. The head position and/or viewing angle determination module 1118 is configured to determine a current viewing angle and/or a current head position of the user, e.g., position of the head mounted display. In some embodiments the determined current viewing angle and/or a current head position is used to determine the relative location of objects in the physical environment. The decoder 1120 is configured to decode encoded image content 1142, e.g., encoded content corresponding to a scene received from a content delivery system to produce decoded image data 1144. The decoded image data 1144 may include decoded stereoscopic scene and/or decoded scene portions.

The 3D image renderer 1122 generates a simulated environment, e.g., 3D environment, including content corresponding to a scene and visual representation of one or more objects detected in the physical environment in accordance with the features of the present invention for displaying to a user on the display 1102 and/or the display device 1105. The 3D image renderer 1122 uses the decoded content 1144 and generated visual representations of objects 1146 to generate the simulated environment including content 1148. The generated simulated environment content 1148 which is displayed to a user is the output of the 3D image renderer 1122.

The sensor controller 1124 is configured to control a sensor to capture information corresponding to the physical environment where the user and/or the system 1100 is physically located. In some embodiments the sensor is a camera, e.g., camera 1105, and the controller 1124 is configured to control the camera to capture an image of the environment as part of being configured to control said sensor to capture information corresponding to the physical environment.

The object detector 1126 is configured to detect one or more objects in a physical environment where a user of the interactive system 1100 is physically located. In various embodiments the object detector 1126 includes a symbol recognizer 1128 and an object identifier 1130. The symbol recognizer 1128 is configured to recognize a predetermined symbol on an object using an optical recognition technique. In various embodiments different predetermined symbols are used for different types of objects in the physical environment, each symbol having a predetermined shape, size or color. In some embodiments using an optical recognition technique the symbol recognizer 1128 recognizes a first predetermined symbol on a first object and a second predetermined symbol on a second object. The object identifier 1130 is configured to identify one or more objects in the environment based on the recognized predetermined symbol on the one or more objects having the symbols. In some embodiments the object identifier 1130 is configured to identify the first object and the second object in the environment based on the recognized first and second predetermined symbols on the first and second objects respectively. In various embodiments the object identifier 1130 uses the stored mapping information 1138 to which objects maps to which symbol and thus identify the objects based on the mapping information.

The determiner 1132 is configured to determine whether visual representations of one or more detected objects should be displayed to the user. In order to make such determination in some embodiments the determiner 1132 is configured to check the list of objects of interest and/or parental control restrictions in a user record corresponding to the current user stored as part of information 1140. In some embodiments the determiner 1132 is configured to determine whether one or more objects that have been detected to be present in the physical environment are included in a list of objects that have been indicated by a user (e.g., a current user of system 1100 at a given time) as being of interest. In the case where the first and second objects are detected by the object detector the determiner 1132 is configured to determine if the first and second detected objects are included in a list of objects that have been indicated by the user as being of interest. In one embodiment a user record corresponding to a first user (stored as part of user records 1140) indicates that the first detected object is included in a list of objects which are of interest to the first user while the second detected object is not in the list. In one such embodiment the determiner 1132 is configured to check the user record of the first user to determine that the first detected object is included in the list of object and the second object is not included in the list. In some embodiments the determiner 1132 is further configured to determine if any parental control restrictions apply to the current user, e.g., to determine if the user is not allowed to be presented visual representation of one or more objects due to parental control restrictions. In one example the determiner 1132 is configured to determine that a visual representation of the second object should not be displayed to the user due to the parental control restrictions while the visual representation of the first object should be displayed. In some embodiments the determiner 1132 is configured to perform the operation corresponding to the step 734 (including steps 736 through 748) to make the determinations in accordance with the invention.

The object location determinator 1134 is configured to determine a location of one or more detected objects in the environment relative to the user in the physical environment, e.g., in the manner as discussed in steps 752, 754 and 756 in flowchart 700 and with regard to FIG. 8. In various embodiments the object location determinator 1134 is configured to determine the locations of one or more detected objects for which it has been determined (e.g., by the determiner 1132) that a visual representation is to be displayed. In some embodiments when it is determined that visual representation of the second object should not be displayed while the visual representation of the first object should be displayed, the object location determinator 1134 is configured to determine the location of the first object relative to the location of the user in the physical environment. In some embodiments the object location determinator 1134 is configured to determine an angle between each of the one or more objects, for which it is determined that a visual representation is to be displayed, and a forward viewing direction of the user in the physical environment, as part of being configured to determine the location of the one or more objects relative to the user. In some embodiments the object location determinator 1134 is configured to determine a distance from the user to the one or more objects, for which it is determined that a visual representation is to be displayed, in the physical environment, as part of being configured to determine the location of the one or more objects relative to the user.

The display controller 1136 is configured to control displaying of a simulated environment to the user on display device 1102, and control displaying of visual representations of one or more detected objects on the display device as part of controlling displaying of the simulated environment to the user. In various embodiments the display controller 1136 is further configured to present the visual representations of one or more objects in the simulated environment at locations determined based on the location of these one or more objects relative to the user in the physical environment, as part of being configured to control displaying of the visual representation of the objects. In various embodiments the display controller 1136 is further configured to exclude, from being displayed, visual representations of objects which are determined not to be displayed (e.g., by the determiner 1132). In some embodiments the display controller 1136 is further configured to exclude, from being displayed, visual representations of objects which are not on the list of objects which are indicated by the user as being of interest to the user. In some embodiments the display controller 1136 is configured to exclude a visual representation of the second object from being displayed when said determiner 1132 determines that said second object is not included in the list of object. In some embodiments the display controller 1136 is further configured to exclude, from being displayed, visual representation of detected objects which are restricted from being displayed to a user due to the parental control restrictions applicable to the user. For example in the case discussed above when it is determined that parental control restrictions for the first user do not allow a visual representation of the second object to be displayed, the display controller 1136 is configured to exclude, from being displayed, visual representation of the second object to the first user.

The mapping information 1138 includes information indicating a mapping between different symbols and different types of objects. The mapping information 1138 is the same as or similar to the exemplary mapping information table 1000 illustrated in FIG. 10 and discussed earlier and a accordingly the discussion will not be repeated. The user information records 1140 include user records corresponding to a plurality of users which may use the system 1100 at some time. The user information records 1140 are the same or similar to the user information records 900 discussed with regard to FIG. 9. Each user corresponding to an individual user in the record in the user information records 1140 includes information corresponding to the individual first user including, e.g., user name, user login/identification information, user age information, a list of objects that are of interest to the individual user, and parental control restrictions applicable to the user. The parental control restrictions applicable to the user may be in the form of a list of objects to which parental control restrictions apply, e.g., restricted objects for which visual representation should not be displayed to the first user.

In some embodiments the modules and/or elements (e.g., elements 1116 through 1136) shown in the memory 1112 are implemented as software modules. In other embodiments the elements, while shown to be included in the memory 1112, are implemented in hardware, e.g., as individual circuits with each element being implemented as a circuit for performing the function corresponding to the element. In still other embodiments the modules and/or elements are implemented using a combination of software and hardware.

While shown in FIG. 11 example to be included in the memory 1112, the elements shown included in the system 1100 can, and in some embodiments are, implemented fully in hardware within the processor 1108, e.g., as individual circuits. In other embodiments some of the elements are implemented, e.g., as circuits, within the processor 1108 with other elements being implemented, e.g., as circuits, external to and coupled to the processor 1108. As should be appreciated the level of integration of modules on the processor and/or with some modules being external to the processor may be one of design choice. Alternatively, rather than being implemented as circuits, all or some of the elements may be implemented in software and stored in the memory 1112 of the system 1100, with the software modules controlling operation of the system 1100 to implement the functions corresponding to the modules when the modules are executed by a processor, e.g., processor 1108. In still other embodiments, various elements are implemented as a combination of hardware and software, e.g., with a circuit external to the processor 1108 providing input to the processor 1108 which then under software control operates to perform a portion of a module's function.

While shown in the FIG. 11 embodiment as a single processor, e.g., computer, it should be appreciated that the processor 1108 may be implemented as one or more processors, e.g., computers. When one or more elements in the memory 1112 are implemented as software modules, the modules include code, which when executed by the processor 1108, configure the processor 1108 to implement the function corresponding to the module. In embodiments where the various modules shown in FIG. 110 is stored in the memory 1112, the memory 1112 is a computer program product comprising a computer readable medium comprising code, e.g., individual code for each module, for causing at least one computer, e.g., processor 1108, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 11 control and/or configure the system 1100 or elements therein such as the processor 1108, to perform the functions of corresponding steps of the methods of the present invention, e.g., such as those illustrated and/or described in the flowchart 700.

An exemplary method of operating an interactive system (e.g., system 100/system 200), comprises: detecting one or more objects in a physical environment where a user of the interactive system is physically located; and displaying a simulated environment to the user, displaying a simulated environment including displaying, on a display, a visual representation of at least a first detected object. In some embodiments the simulated environment is a 3D simulated environment including content corresponding to a scene of an event (e.g., sporting event). In some embodiments event is a sporting event and the 3D environment corresponds to a stadium, arena or theater. In some embodiments the first detected object is one of a beer can, a beer bottle, a beer container, a soda container, a soda can, a soda bottle, a bag of chips, a bag of popcorn, a bowl of chips, a bowl of popcorn, a cigarette pack, a cigar case, or a bowl of ice cream.

In some embodiments the method further comprises: operating a sensor (e.g. camera located on a cell phone in headset or a camera on a game console coupled to a headset) to capture information corresponding to the physical environment where the user is physically located, prior to the step of displaying a visual representation of the first detected object. In some embodiments the sensor is a camera and wherein the operating a sensor to capture information corresponding to the physical environment includes operating the camera to capture an image of the environment.

In some embodiments the method further comprises: determining a location of the first object relative to the user in the physical environment. In some embodiments displaying the visual representation of at least the first detected object includes presenting the visual representation of the first object in the simulated environment at a location determined based on the location of the first object relative to the user in the physical environment. In some embodiments determining a location of the first object relative to the user includes determining an angle between the first object and a forward viewing direction (e.g., offset from forward facing position which maybe interpreted as a 0 viewing angle) of the user in the physical environment. In some embodiments determining a location of the first object relative to the user further includes determining a distance from the user to the first object. In some embodiments determining the distance is based on a size of an image of the first object, in an image captured by a camera, of a symbol of a predetermined size and shape which appears on the first object. For example the relative size of symbol in the image is compared to known size and used to estimate distance to object).

In some embodiments detecting one or more objects in the physical environment includes: recognizing a first predetermined symbol on at least the first object using an optical recognition technique, different predetermined symbols being used for different types of objects in the physical environment, each symbol having a predetermined shape, size or color; and identifying the first object in the environment based on the recognized first predetermined symbol on the first object.

In some embodiments detecting one or more objects in the physical environment includes detecting the first object and a second object. In some such embodiments the method further comprises: prior to the step of displaying a visual representation of the at least the first detected object, determining if the detected first and second objects are included in a list of objects that have been indicated by the user as being of interest, the determining indicating that the first detected object is included in the list while the second object is not included in the list. In some such embodiments the step of displaying a visual representation of at least the detected first object on the display includes excluding, from being displayed, visual representations of objects which are not on the list of objects, a visual representation of the second object not being displayed.

In some embodiments the method further comprises: prior to the step of displaying a visual representation of the first detected object, determining if any parental control restrictions apply to the user, the determining indicating that a visual representation of the second object should not be displayed to the user due to the parental control restrictions. In some such embodiments the step of displaying a visual representation of at least the first detected object on the display includes excluding the visual representation of the second detected object from being displayed due to the parental control restrictions.

In some embodiments the method further comprises: receiving mapping information, from the user of the interactive system, indicating a mapping between each of the one or more objects and corresponding symbols, different symbols being used on different types of objects in the physical environment, each symbol having a predetermined shape, size or color, and storing the received mapping information in memory.

In some embodiments the method further comprises: receiving (e.g., from an administrator of the system) user information corresponding to the user of the interactive system, the user information including age of the user and optionally parental control information applicable to the user, and storing the received user information in memory. In some embodiments the parental control information applicable to the user indicates at least one object for which a corresponding visual representation should not be presented to the first user.

In some embodiments the method further comprises determining if the visual representation of the at least first detected object is allowed to be displayed based on the received user information prior to displaying a visual representation of the at least first detected object.

An exemplary interactive system in accordance with the invention comprises: an object detector configured to detect one or more objects in a physical environment where a user of the interactive system is physically located; a display device; and a display controller configured to control displaying of a simulated environment to the user on the display device, the display controller being configured to control displaying of a visual representation of at least a first detected object on the display device as part of controlling displaying of the simulated environment to the user.

In some embodiments the system further comprises a sensor; and a sensor controller configured to control the sensor to capture information corresponding to the physical environment where the user is physically located. In some embodiments the sensor is a camera and wherein the sensor controller is configured to control the camera to capture an image of the environment as part of being configured to control the sensor to capture information corresponding to the physical environment.

In some embodiments the system further comprises a location determinator configured to determine a location of the first object relative to the user in the physical environment. In some embodiments the display controller is further configured to present the visual representation of the first object in the simulated environment at a location determined based on the location of the first object relative to the user in the physical environment, as part of being configured to control displaying of the visual representation of at least the first detected object. In some embodiments the location determinator is configured to determine an angle between the first object and a forward viewing direction of the user in the physical environment, as part of being configured to determine the location of the first object relative to the user in the physical environment. In some embodiments location determinator is configured to determine a distance from the user to the first object, as part of being configured to determine the location of the first object relative to the user in the physical environment. In some embodiments the location determinator is configured to determine the distance from the user to the first object based on a size of an image of the first object, in an image captured by a camera, of a symbol of a predetermined size and shape which appears on the first object.

In some embodiments the object detector includes: a symbol recognizer configured to recognize a first predetermined symbol on at least the first object using an optical recognition technique, different predetermined symbols being used for different types of objects in the physical environment, each symbol having a predetermined shape, size or color; and an identification module configured to identify the first object in the environment based on the recognized first predetermined symbol on the first object.

In some embodiments the system further includes a determiner configured determine if the visual representation of the at least first detected object is allowed to be displayed based on the received user information. In some embodiments the object detector detects the first object and a second object. In some embodiments the determiner is configured to determine if the first and second detected objects are included in a list of objects that have been indicated by the user as being of interest. In some embodiments the display controller is further configured to exclude, from being displayed, visual representations of objects which are not on the list of objects, the display controller being configured to exclude a visual representation of the second object from being displayed when the determiner determines that the second object is not included in the list of object.

In some embodiments the determiner is further configured to determine if any parental control restrictions apply to the user, the determiner determining at a first time that a visual representation of the second object should not be displayed to the user due to the parental control restrictions. In some such embodiments the display controller is further configured to exclude, from being displayed, the visual representation of the second detected object from being displayed due to the parental control restrictions applicable to the user.

In some embodiments the system further includes a receiver configured to receive mapping information, from the user of the interactive system, indicating a mapping between each of the one or more objects and corresponding symbols, different symbols being used on different types of objects in the physical environment, each symbol having a predetermined shape, size or color; and a memory configured to store the received mapping information.

In some embodiments the system further includes a receiver configured to receive user information corresponding to the user of the interactive system, the user information including age of the user and optionally parental control information applicable to the user; and a memory configured to store the received user information. In some embodiments the parental control information applicable to the user indicates at least one object for which a corresponding visual representation should not be presented to the first user.

The techniques of various embodiments may be implemented using software, hardware and/or a combination of software and hardware. Various embodiments are directed to system, e.g., a rendering and playback system. Various embodiments are also directed to methods, e.g., a method of controlling/operating a rendering and playback system. n various embodiments system elements described herein are implemented using one or more modules which are used to perform the steps corresponding to one or more methods of the present invention. Each step may be performed by one or more different software instructions executed by a computer processor, e.g., a central processing unit (CPU).

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a computer readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Some embodiments are directed a non-transitory computer readable medium embodying a set of software instructions, e.g., computer executable instructions, for controlling a computer or other device to implement the steps of the methods of present invention.

Numerous additional variations on the methods and system of the various embodiments described above will be apparent to those skilled in the art in view of the above description. Such variations are to be considered within the scope.

What is claimed is:

1. A method of operating an interactive system including a head mounted cell phone, comprising:
   operating a camera of the head mounted cell phone to capture an image of a physical environment where a user of said interactive system is physically located;
   operating a processor in the cell phone to process the captured image to detect one or more objects in the physical environment where the user of said interactive system is physically located; and
   displaying, on a display device of said head mounted cell phone, a simulated environment to said user, said displaying a simulated environment including displaying on the display device of said head mounted cell phone multiple frames between the capture of the image of the physical environment and a capture of another image of the physical environment, said displaying a simulated environment including displaying a visual representation of at least a first detected object as part of said simulated environment.

2. The method of claim 1, wherein said camera is positioned in said head mounted cell phone facing away from the user and with the display device of said head mounted cell phone facing the eyes of the user.

3. The method of claim 2, further comprising:
performing on a recurring basis, at a rate which is lower than a rate at which frames are displayed on the display of said head mounted cell phone, said steps of: i) operating said camera of the head mounted cell phone to capture an image of a physical environment where a user of said interactive system is physically located and ii) operating said processor in the cell phone to detect one or more objects in the physical environment where the user of said interactive system is physically located, at least 30 frames being displayed between each capture of an image by the camera of the cell phone.

4. The method of claim 2, further comprising:
operating the processor in the cell phone to determine a location of the first object relative to the user in the physical environment; and
wherein displaying the visual representation of at least the first detected object includes presenting the visual representation of the first object in the simulated environment at a location determined based on the location of said first object relative to the user in the physical environment.

5. The method of claim 4, wherein operating the processor in the cell phone to determine the location of the first object relative to the user further includes determining a distance from the user to the first object.

6. The method of claim 2 wherein displaying, on a display device of said head mounted cell phone, a simulated environment to said user includes:
displaying different images on left and right sides of said display device of said head mounted cell phone.

7. The method of claim 1, wherein operating the processor in the cell phone to detect one or more objects in said physical environment includes:
recognizing a first predetermined symbol on at least said first object using an optical recognition technique, different predetermined symbols being used for different types of objects in said physical environment, each symbol having a predetermined shape, size or color; and
identifying said first object in said environment based on the recognized first predetermined symbol on said first object.

8. The method of claim 1,
wherein operating a processor in the cell phone to detect one or more objects in the physical environment includes detecting said first object and a second object, the method further comprising:
prior to said step of displaying a visual representation of the at least the first detected object, determining if the detected first and second objects are included in a list of objects that have been indicated by the user as being of interest, said determining indicating that said first detected object is included in said list while said second object is not included in said list; and
wherein said step of displaying a visual representation of at least the first detected object on the display includes excluding, from being displayed, visual representations of detected objects which are not on said list of objects that have been indicated by the user as being of interest, a visual representation of said second object not being displayed.

9. The method of claim 8, further comprising:
prior to said step of displaying a visual representation of the first detected object, determining if any parental control restrictions apply to said user, said determining indicating that a visual representation of said second object should not be displayed to the user due to the parental control restrictions; and
wherein said step of displaying, on the display of said head mounted cell phone, a visual representation of at least a first detected object as part of said simulated environment includes excluding said visual representation of the second detected object from being displayed due to said parental control restrictions.

10. The method of claim 1, further comprising:
receiving mapping information, from said user of said interactive system, indicating a mapping between each of said one or more objects and corresponding symbols, different symbols being used on different types of objects in said physical environment, each symbol having a predetermined shape, size or color; and
storing the received mapping information in memory.

11. The method of claim 1, further comprising:
receiving user information corresponding to said user of the interactive system, said user information including age of the user and optionally parental control information applicable to the user; and
storing the received user information in memory.

12. The method of claim 11, further comprising:
prior to said step of displaying a visual representation of the at least first detected object determining if said visual representation of the at least first detected object is allowed to be displayed based on the received user information.

13. An interactive system, comprising:
a head mount including a slot;
a cell phone inserted into said slot, the cell phone including: i) a camera facing away from the head mount, ii) a display facing towards a position where a user's eyes are located when the head mount is positioned on a head of a user and iii) a processor;
and wherein said processor of the cell phone is configured to:
process an image captured by the camera of said cell phone to detect one or more objects in a physical environment where a user of said interactive system is physically located; and
control displaying of a simulated environment to said user on said display, said processor being configured to control displaying of a visual representation of at least a first detected object on said display as part of being configured to control as part of displaying of the simulated environment to said user.

14. The system of claim 13, further comprising:
a sensor; and
a controller configured to control said sensor to capture information corresponding to the physical environment where the user is physically located.

15. The system of claim 14, wherein said sensor is included in said camera and wherein said controller is configured to control said camera to capture an image of the environment as part of being configured to control said sensor to capture information corresponding to the physical environment.

16. The system of claim 13, further comprising:
a location determinator configured to determine a location of the first detected object relative to the user in the physical environment; and
wherein said processor is further configured to present the visual representation of the first detected object in the simulated environment at a location determined based on the location of said first detected object relative to the user in the physical environment, as part of being configured to control displaying of the visual representation of at least the first detected object.

17. The system of claim 13, wherein said processor is further configured to:
recognize a first predetermined symbol on at least said first detected object using an optical recognition technique, different predetermined symbols being used for different types of objects in said physical environment, each symbol having a predetermined shape, size or color; and
identify said first detected object in said environment based on the recognized first predetermined symbol on said first detected object.

18. The system of claim 13, wherein said processor detects said first object and a second object;
wherein the system further comprises a determiner configured to determine if the first and second detected objects are included in a list of objects that have been indicated by the user as being of interest; and
wherein said processor is further configured to exclude, from being displayed, visual representations of objects which are not on said list of objects, said display controller being configured to exclude a visual representation of said second object from being displayed when said determiner determines that said second object is not included in said list of objects.

19. The system of claim 18, wherein said determiner is further configured to determine if any parental control restrictions apply to said user, said determiner determining that a visual representation of said second object should not be displayed to the user due to the parental control restrictions; and
wherein said processor is further configured to exclude, from being displayed, said visual representation of the second detected object due to said parental control restrictions applicable to said user.

20. The system of claim 13, further comprising:
a receiver configured to receive mapping information, from said user of said interactive system, indicating a mapping between each of said one or more objects and corresponding symbols, different symbols being used on different types of objects in said physical environment, each symbol having a predetermined shape, size or color; and
a memory configured to store the received mapping information.

21. A non-transitory computer readable medium including processor executable instructions which when executed by a processor of a head mounted cell phone of an interactive system control the interactive system to:
operate a camera of the head mounted cell phone to capture an image of a physical environment where a user of said interactive system is physically located;
operate the processor in the cell phone to process the captured image to detect one or more objects in the physical environment where the user of said interactive system is physically located; and
display, on a display device of said head mounted cell phone, a simulated environment to said user, said displaying a simulated environment including displaying on the display device of said head mounted cell phone multiple frames between the capture of the image of the physical environment and a capture of another image of the physical environment, said displaying a simulated environment including displaying a visual representation of at least a first detected object as part of said simulated environment.

* * * * *